United States Patent [19]
Yen et al.

[11] Patent Number: 5,434,952
[45] Date of Patent: Jul. 18, 1995

[54] SYSTEM AND METHOD FOR SPECIFYING AN EXPERT SYSTEM

[75] Inventors: Chia H. Yen; Jonathan Y. Lee, both of College Station, Tex.

[73] Assignee: The Texas A&M Univesity System, College Station, Tex.

[21] Appl. No.: 904,815

[22] Filed: Jun. 26, 1992

[51] Int. Cl.⁶ .............................................. G06F 15/18
[52] U.S. Cl. ....................................... 395/50; 395/54; 395/650
[58] Field of Search ........................ 395/50, 11, 65, 54, 395/80, 82, 650

[56] References Cited

U.S. PATENT DOCUMENTS

| | | | |
|---|---|---|---|
| 4,591,983 | 5/1986 | Bennett et al. | 395/65 |
| 4,949,278 | 8/1990 | Davies et al. | 395/11 |

OTHER PUBLICATIONS

The roles of the Task Structure and Domain Functional Models IEEE Jun. 1991 M. C. Tanner et al.
A Task Structure for Case-Based Design A. K. Goel et al. IEEE 4–7 Nov. 1990.
Hierarchical Classification: Its Usefulness for Diagnosis and Sensor Validation IEEE, 5 Jun. 1988 B. Chandrasekaran et al.
Methods for Selecting Promising Expert System IEEE, 1990 T. Beckman May 1990.
J. McDermott, "8. Preliminary Steps Toward a Taxonomy of Problem-Solving Methods", *Automating Knowledge Acquisition for Expert Systems*, pp. 224–257.
S. Marcus, "4. SALT: A Knowledge-Acquisition Tool for Propose-and-Revise Systems", *Automating Knowledge Acquisition for Expert Systems*, pp. 80–123.
P. S. Rosenbloom, J. E. Laird, J. McDermott, A. Newell and E. Orciuch, "R1-Soar: An Experiment in Knowledge-Intensive Programming in a Problem-Solving Architecture", *IEEE Transactions on Pattern Analysis and Machine Intelligence*, vol. PAMI-7, No. 5, Sep. 1985, pp. 561–569.
G. R. Yost and A. Newell, "A Problem Space Approach to Expert System Specification", *Machine Learning, School of Computer Science, Carnegie Mellon University*, pp .621–627.
I. A. Zualkeman and W. T. Tsai, "Are Knowledge Representations the Answer to Requirement Analysis?", *IEEE*, 1988, pp. 437–443.
D. Hamilton, K. Kelley, and C. Culbert, "State-of-the-Practice in Knowledge-Based System Verification and Validation", *Expert Systems With Applications*, vol. 3, 1991, pp. 403–410.
J. Lee and J. Yen, "Toward a General Methodology for Specifying Expert Systems", *Proceedings of the IEEE, International Conference on Tools for Artificial Intelligence*, Nov. 1991, pp. 260–263.
J. Yen and J. Lee, "Toward a Knowledge Specification Language Using Conceptual Graphs", *The World of Congress on Expert Systems Proceedings*, 1991, pp. 1897–1092.
J. Yen, J. Lee, and D. Hamilton, "Expert Systems Design Method Supporting Verification", *Dependability of Artificial Intelligence Systems*, 1991, pp. 121–131.
J. Yen, R. Neches, and R. MacGregor, "CLASP: Integrating Term Subsumption Systems and Production Systms", *IEEE Transactions on Knowledge and Data Engineering*, vol. 3, No. 1, Mar. 1991, pp. 25–32.
J. Yen and J. Lee, "Expert System Design Methods Supporting Verification: A Final Report", *Department of Computer Science, Texas A&M University*, Dec. 1990.

(List continued on next page.)

*Primary Examiner*—Allen R. MacDonald
*Assistant Examiner*—Richemond Dorvil
*Attorney, Agent, or Firm*—Baker & Botts

[57] ABSTRACT

A method and system are provided for specifying an expert system. Multiple task specifications are formed for specifying tasks as functional units of the expert system. Multiple method specifications are formed for specifying methods for accomplishing ones of the tasks. At least one of the tasks is specified as a subtask of at least one of the methods, such that ones of the task specifications are organized as a structure having multiple levels of tasks.

34 Claims, 17 Drawing Sheets

OTHER PUBLICATIONS

J. Lee and J. Yen, "The Formal Foundation of a Task-Based Specification Methodology for Expert Systems", *Department of Computer Science, Texas A&M Uinversity*, 1991.

B. Auernheimer and R. A. Kemmerer, "ASLAN User's Manual", *Department of Computer Science*, Revised Mar. 1985.

A. Gabrielian and Matthew K. Franklin, "Multilevel Specification of Real-Time Systems", *Communications of the ACM*, May 1991, vol. 34, No. 5, pp. 51-60.

C. Lafontaine, Y. Ledru, and Pierre-Yves Schobbens, "An Experiment in Formal Software Development: Using the B Theorem Prover on a VDM Case Study", *Communications of the ACM*, May 1991, vol. 34, No. 5, pp. 63-71.

A. C. Shaw, "Software Specification Languages Based on Regular Expressions", *Department of Computer Science, University of Washington*, (1978-1979).

W. J. Clancey, "Heuristic Classification", *Elsevier Science Publishers B.V. (North-Holland)*, 1985, pp. 289-349.

E. P. D. Pednault, "Extending Conventional Planning Techniques to Handle Actions with Context-Dependent Effects", *Automated Reasoning*, pp. 55-59.

E. P. D. Pednault, "Formulating Multiagent, Dynamic-World Problems in the Classical Planning Framework", *AT&T Bell Laboratories*, pp. 675-710.

L. Steels, "Components of Expertise", *AI Magazine*, 1990, pp. 29-49.

B. Chandrasekaran, "Design Problem Solving: A Task Analysis", *AI Magazine*, 1990, pp. 59-71.

B. Chandrasekaran, "Generic Tasks in Knowledge-Based Reasoning: High-Level Building Blocks for Expert System Design", *IEEE*, 1986, pp. 23-29.

"Managing Plans of Action", pp. 487-552.

J. Rushby, "Quality Measures and Assurance for AI Software", *NASA, Scientific and Technical Information Division*, 1988, Contractor Report 4187.

A. Batarekh, et al., "Specifying an Expert System", *Department of Computer Science, Concordia University*, 1990.

A. D. Preece, "The Role of Specifications in Expert System Evaluation", *Department of Computer Science, Concordia University*, Jun. 1990.

J. R. Slagle and D. A. Gardiner, "Knowledge Specification of an Expert System", *IEEE EXPERT*, 1990, pp. 29-38.

I. A. Zualkerman, P. E. Johnson and J. H. Moller, "Utility of Knowledge Level Specifications" *Department of Pediatrics, University of Minnesota*, 1988, pp. 79-85.

W. T. Tsai, et al., "Requirements Specification for Expert Systems: A Case Study", *Computer Science Department, University of Minnesota*, Technical Report, Jun. 1988.

J. Yen, Hsiao-Lei Juang, and R. MacGregor, "Using Polymorphism to Improve Expert System Maintainability", *IEEE EXPERT*, 1991, pp. 48-55.

R. H. Campbell, "PATH EXPRESSIONS: A Technique for Specifying Process Synchronization", *Department of Computer Science, University of Illinois*, May 1977.

R. Slagle, Kyungsook Han, D. A. Gardiner, A. A. Teklemariam, J. A., Vayghan, "An Experiment with a Methodology for Creating a Knowledge Specification of an Expert System", *Computer Science Department, University of Minnesota*, Technical Report, Mar. 1988.

B. Auernheimer and R. A. Kemmerer, "RT-ASLAN: A Specification Language for Real-Time Systems", *IEEE Transactions on Software Engineering*, vol. SE-12, No. 9, Sep. 1986, pp. 879-889.

W. E. Howden, "Comments Analysis and Programming Errors", *IEEE Transactions on Software Engineering*, vol. 16, No. 1, Jan. 1990, pp. 72-81.

F. Belli and K-E. Grosspietsch, "Specification of Fault-Tolerant System Issues by Predicate/Transition Nets and Regular Expressions-Approach and Case Study", *IEEE Transactions on Software Engineering*, vol. 17, No. 6, Jun. 1991, pp. 513-526.

J. Michael Spivey, "Specifying a Real-Time Kernel", *IEEE Software*, Sep. 1990, pp. 23-28.

T. Bylander and B. Chandrasekaran, "Generic Tasks for Knowledge-Based Reasoning: The Right Level of Abstraction for Knowledge Acquisition", *Int. J. Man-Machine Studies*, (1987) 26, pp. 231-243.

B. N. Freeman-Benson, J. Maloney and A. Borning, "An Incremental Constraint Solver", *Communications of the ACM*, vol. 33, No. 1, Jan. 1990, pp. 54-63.

J. M. Wing, "A Specifier's Introduction to Formal Methods", *IEEE COMPUTER*, 1990, pp. 8-24.

S. J. Rosenschein, "PLAN SYNTHESIS: A Logical Perspective", *International Joint Conferences on Artificial Intelligence, Inc.*, Chapter 7, Formal Models of Planning Systems, 1981, pp. 531-536.

M. P. Georgeff and A. L. Lansky, "Procedural Knowledge", *Proceedings of the IEEE*, vol. 74, No. 10, Oct. 1986, pp. 1383-1398.

```
                          TAME PROJECT MANAGEMENT
*INFO *PROJECT TITLE: R1/SOAR

CREATION DATE: 13:21:17;15 JUNE 92           PROJECT VERSION: 0
*INFO *REVISION DATE:
```

TYPES OF THE PROJECT:

*INFO *TYPE OF DOMAIN OF THE PROJECT: COMPUTER CONFIGURATION

*INFO *TYPE OF TASK OF THE PROJECT: SYNTHESIS (CONFIGURATION)

SOURCES OF KNOWLEDGE/EXPERTISE:

*INFO *DOMAIN EXPERT: TOM COPPER

*INFO *OTHER SOURCES: ORIGINAL IMPLEMENTATION AND DOCUMENTATION

KNOWLEDGE ENGINEERING:

*INFO *KNOWLEDGE ENGINEER: JONATHAN LEE

*INFO *STATUS OF THE PROJECT:

*INFO *NOTES: THIS PROJECT IS TO ILLUSTRATE THE IDEA OF USING TAME FOR
              ACQUIRING THE KNOWLEDGE FROM BOTH DOMAIN EXPERT AND
              DOCUMENTATION.

| GLOBAL LIST | SYSTEM MENU |
|---|---|
| *@TAME HOME: | *@CREATE A NEW TAMEBASE |
| *@TAME INDEX: | *@OPEN AN EXISTING TAMEBASE |
| *@ACQUISITION SESSIONS LIST: | *@DELETE AN EXISTING TAMEBASE |
| | *@EXIT TAME |

FIG. 6a

ACQUISITION SESSIONS LIST

| SESSION NUMBER | SESSION TITLE AND ID |
|---|---|
| *INFO  *SESSION NUMBER: 1 | *INITIAL ATTEMPT (SESSION ID: 1)  142 |

| GLOBAL LIST | LOCAL LIST |
|---|---|
| *@TAME INDEX:  *@PROJECT MANAGEMENT FORM: | |

ACQUISITION SESSION

SESSION ID: 1

*INFO *SESSION TITLE: INITIAL ATTEMPT

CREATION DATE: 15 JUNE 92

*INFO *REVISION DATE:

*INFO *DOMAIN EXPERT: TOM COPPER

*INFO *KNOWLEDGE ENGINEER: JONATHAN LEE

---

*INFO *NOTES: THIS ACQUISITION SESSION IS AN INITIAL ATTEMPT TO ACQUIRE AND ORGANIZE THE KNOWLEDGE INTO THIS KNOWLEDGE DOCUMENTATION. OTHER ACQUISITION SESSIONS CAN THUS BE FOLLOWED EITHER TO REFINE THE CURRENT SESSION OR TO FURTHER EXTEND THE KNOWLEDGE DOCUMENT TO INCORPORATE KNOWLEDGE NOT INCORPORATED.

---

| GLOBAL LIST | LOCAL LIST |
|---|---|
| 142 *@TAME INDEX: <br> *@TASKS LIST: <br> *@ACQUISITION SESSIONS LIST: <br> *@REFINEMENT: <br> *@PROJECT MANAGEMENT FORM: | *@METHODS: <br> *@TASKS: |

*FIG. 6c*

TASK DESCRIPTION

*TASK ID: 1.1
*INFO　*TASK TITLE:　CONFIGURE UNIBUS
*INFO　*TYPE OF TASK:　NON-PRIMITIVE TASK

*INFO　*DOMAIN MODEL:
*INFO　*STATE MODEL:
*INFO　FUNCTION:

*PRECONDITION: THERE EXISTS A SEQUENCE OF UNIBUS MODULES
　　　　　　　　　　ORDERED BASED ON THEIR OPTIMAL CONFIGURATION
　　　　　　　　　　SEQUENCE, AND BACKPLANES, BOXES, UNIBUSES FROM
　　　　　　　　　　THE CUSTOMER'S ORDER.

*TO SET UP PROTECTION: CREATE A NEW PROTECTION.
　　　*PROTECTION: THE OPTIMAL ORDERING OF MODULES MUST BE MAINTAINED.

*POSTCONDITION:
　　　　*RIGID: THERE EXISTS A FEASIBLE CONFIGURATION IN WHICH ALL
　　　　　　　　BACKPLANES ARE CABLED BACKPLANES.
　　　　*SOFT: 1) MODULES ARE CONFIGURED IN THEIR OPTIMAL ORDERING.
　　　　　　　　2) WASTED CABINET SPACE AND BACKPLANE SLOTS ARE
　　　　　　　　　 MINIMAL, AND 3) ADDITIONAL COMPONENTS THAT NEED TO BE
　　　　　　　　　 ORDERED ARE LEAST EXPENSIVE.

*INFO BEHAVIOR:
　　　*TASK LEVEL TSE: (+)

---

| GLOBAL LIST | LOCAL LIST |
|---|---|
| *@TAME INDEX: | |
| *@METHODS LIST: | |
| *@TASKS LIST: | |
| *@ACQUISITION SESSIONS LIST: | *@PARENT METHOD: |
| *@PROJECT MANAGEMENT FORM: | *@PARENT TASK: |
| | *@PARENT SESSION: |

*FIG. 6e*

```
                                          136
                                         ╱
┌─────────────────────────────────────────────────────┐
│                                                     │
│                 METHOD DESCRIPTION                  │
│                                                     │
│       *METHOD ID: 1.1.1                             │
│        METHOD OF: CONFIGURE UNIBUS                  │
│   *INFO *METHOD TITLE: PROPOSE-REVISE               │
│          GUARD CONDITION:  ↖142                     │
│   *INFO SUBTASKS:                                   │
│                                                     │
│  SUBTASK NUMBER        SUBTASK TITLE AND ID         │
├──────────────────────┬──────────────────────────────┤
│  *INFO               │                              │
│   *SUBTASK NUMBER: 1 │ *UNASSIGNED BACKPLANE (TASK ID: 1.1.1.1) │
│                      │                              │
│   *SUBTASK NUMBER: 2 │ *OPTIMAL CONFIGURATION (TASK ID: 1.1.1.2) │
│                      │                              │
│                      │                              │
│                      │                              │
│                      │                              │
│                      │                              │
│                      │                              │
├──────────────────────┴──────────────────────────────┤
│ *INFO *METHOD LEVEL TSE: (UNASSIGNED BACKPLANE, [OPTIMAL CONFIGURATION]) │
│                                                     │
│                                                     │
├────────────────────────────┬────────────────────────┤
│ GLOBAL LIST                │ LOCAL LIST             │
│              *@TAME INDEX: │                        │
│           *@METHODS LIST:  │                        │
│             *@TASKS LIST:  │      *@PARENT METHOD:  │
│  *@ACQUISITION SESSIONS LIST: │    *@PARENT TASK:   │
│    *@PROJECT MANAGEMENT FORM: │  *@PARENT SESSION:  │
└────────────────────────────┴────────────────────────┘
                       FIG. 6g
```

137

DOMAIN MODEL

DOMAIN OF: CONFIGURE UNIBUS
CONCEPT LIST:

*INFO *CONCEPT:   *MODULE (DOMAIN OBJECT)

*CONCEPT:    *BACKPLANE (DOMAIN OBJECT)

*CONCEPT:    *UNIBUS (DOMAIN OBJECT)

*CONCEPT:    *BOX (DOMAIN OBJECT)

RELATION LIST:

*INFO *RELATION:   *HAS-CONNECTION (DOMAIN RELATION)

| GLOBAL LIST | LOCAL LIST |
|---|---|
| *@TAME INDEX:<br>*@ACQUISITION SESSIONS LIST:<br>*@PROJECT MANAGEMENT FORM: | *@PARENT METHOD:<br>142  *@PARENT TASK:<br>*@PARENT SESSION: |

FIG. 6h

| STATE MODEL | |
|---|---|
| STATE OBJECT OF: CONFIGURE UNIBUS | |
| STATE OBJECT | STATE OBJECT NAME |
| *INFO | *INFO |
| *STATE OBJECT: | *UNCONFIGURED OBJECTS (STATE OBJECT)  142 |
| | *TYPE OF STATE OBJECT: STAGE OF COMPLETION TYPE |
| *STATE OBJECT: | *CONFIGURED OBJECTS (STATE OBJECT) |
| | *TYPE OF STATE OBJECT: STAGE OF COMPLETION TYPE |
| *STATE OBJECT: | *MODULED BACKPLANES (STATE OBJECT) |
| | *TYPE OF STATE OBJECT: STAGE OF COMPLETION TYPE |
| *STATE OBJECT: | *BOXED BACKPLANES (STATE OBJECT) |
| | *TYPE OF STATE OBJECT: STAGE OF COMPLETION TYPE |
| *STATE OBJECT: | *CABLED BACKPLANE (STATE OBJECT) |
| | *TYPE OF STATE OBJECT: STAGE OF COMPLETION TYPE |
| *STATE OBJECT: | *FEASIBLE CONFIGURATION (STATE OBJECT) |
| | *TYPE OF STATE OBJECT: STAGE OF COMPLETION TYPE |

| GLOBAL LIST | LOCAL LIST |
|---|---|
| *@TAME INDEX: | *@PARENT METHOD: |
| *@ACQUISITION SESSIONS LIST: | *@PARENT TASK: |
| *@PROJECT MANAGEMENT FORM: | *@PARENT SESSION: |

STATE OBJECT

STATE OBJECT OF: CONFIGURE UNIBUS

*STATE OBJECT NAME: UNCONFIGURED OBJECTS

TYPE OF STATE OBJECT: STAGE OF COMPLETION TYPE

*STATE OBJECT DEFINITION: UNCONFIGURED OBJECTS ARE OBJECTS GIVEN IN THE CUSTOMER'S ORDER

| GLOBAL LIST | LOCAL LIST |
|---|---|
| 142 *@TAME INDEX: | |
| →*@STATE OBJECTS LIST: | *@PARENT METHOD: |
| *@ACQUISITION SESSIONS LIST: | *@PARENT TASK: |
| *@PROJECT MANAGEMENT FORM: | *@PARENT SESSION: |

TAME INDEX

| *A: | *B: | ⊠C: 142 | *D: | *E: | *F: |
| *G: | *H: | *I: | *J: | *K: | *L: |
| *M: | *N: | *O: | *P: | *Q: | *R: |
| *S: | *T: | *U: | *V: | *W: | *X: |
| *Y: | *Z: | | | | |

| GLOBAL LIST | LOCAL LIST |
|---|---|
| *@TAME HOME:<br>*@ACQUISITION SESSIONS LIST:<br>*@PROJECT MANAGEMENT FORM: | |

*FIG. 6k*

C CATEGORY

*CONFIGURE UNIBUS (TASK ID: 1.1)

*CONFIGURED OBJECTS (STATE OBJECT)

*CABLED BACKPLANE (STATE OBJECT)

*CONFIGURE A BACKPLANE (TASK ID: 1.1.1.1.1.3)

FIG. 6l

SYSTEM AND METHOD FOR SPECIFYING AN EXPERT SYSTEM

TECHNICAL FIELD OF THE INVENTION

This invention relates in general to expert systems and in particular to a method and system for specifying an expert system.

BACKGROUND OF THE INVENTION

In developing an expert system, many previous specification techniques are suitable only for a specific problem solving architecture or for a specific type of expert system (e.g., heuristic classification systems). Accordingly, it is difficult to practically apply such previous techniques to a wide range of expert systems and problem solving architectures. Other previous techniques provide only a conceptual level approach without any formalized proofing of concepts applied to real expert systems.

Some previous techniques, such as rapid prototyping, fail to provide a formal framework for specifying the expert system's functionality. For example, in rapid prototyping techniques, a simple prototype of the expert system is quickly developed without comprehensive formal specification. A shortcoming of such previous techniques is that after developing the simple prototype, no comprehensive formal specification is available to assist in scaling up the simple prototype into a full-scale expert system.

Moreover, with such previous techniques, it is difficult to systematically verify and validate the expert system at intermediate stages of development, since such techniques fail to provide a comprehensive formal specification. Intermediate verification is desirable because it helps identify inadequacies of the expert system at an early stage of development before additional effort is wasted. Similarly, without such a specification, it is difficult to systematically test and maintain the expert system. Accordingly, without such a specification, design failures are more likely to occur, and product costs are more likely to increase.

To assist the verification, validation, testing and maintenance, previous techniques have been used to specify conventional system applications such as filing system, real-time kernel, and user interface design. Nevertheless, such previous techniques have limited application to highly complex and sophisticated expert systems, because such expert systems problems typically are not as well-defined and well-understood as conventional systems problems. Moreover, solutions for conventional systems are algorithmic, while solutions for expert systems typically are non-algorithmic.

Thus, a need has arisen for a method and system for specifying an expert system according to a formal framework. A need has also arisen for a method and system for specifying a wide range of expert systems and problem solving architectures. Further, a need has arisen for a method and system for specifying an expert system to assist in scaling up a prototype into a full-scale expert system. Moreover, a need has arisen for a method and system for specifying an expert system to assist in systematic verification and validation of the expert system at intermediate stages of development. A further need has arisen for a method and system for specifying an expert system to assist in systematic testing and maintenance of the expert system. Another need has arisen for a method and system for specifying an expert system, with formalized proofing of concepts applied to real expert systems.

SUMMARY OF THE INVENTION

In a first aspect of a method and system for specifying an expert system, multiple task specifications are formed for specifying tasks as functional units of the expert system. Multiple method specifications are formed for specifying methods for accomplishing ones of the tasks. At least one of the tasks is specified as a subtask of at least one of the methods, such that ones of the task specifications are organized as a structure having multiple levels of tasks.

In a second aspect, at least one task specification is formed for specifying a task as a functional unit of the expert system. The task is represented as a precondition state before invocations of the task, and a postcondition state after the invocations. A state model is formed including multiple state objects each representing a state of completion in a problem domain of the expert system. The precondition state and postcondition state are specified relative to the state objects.

In a third aspect, the postcondition state is specified as a soft postcondition state, such that the soft postcondition state is true after less than all of the invocations.

It is a technical advantage of the present invention that a method and system are provided for specifying an expert system according to a formal framework.

It is another technical advantage of the present invention that a method and system are provided for specifying a wide range of expert systems and problem solving architectures.

It is a further technical advantage of the present invention that a method and system are provided for specifying an expert system to assist in scaling up a prototype into a full-scale expert system.

It is yet another technical advantage of the present invention that a method and system are provided for specifying an expert system to assist in systematic verification and validation of the expert system at intermediate stages of development.

It is yet a further technical advantage of the present invention that a method and system are provided for specifying an expert system to assist in systematic testing and maintenance of the expert system.

In another technical advantage of the present invention, a method and system for specifying an expert system are provided with formalized proofing of concepts applied to real expert systems.

BRIEF DESCRIPTION OF THE DRAWINGS

For a more complete understanding of the present invention, and the advantages thereof, reference is now made to the following descriptions taken in conjunction with the accompanying drawings, in which:

FIGS. 6a–l are exemplary screen displays of templates of the knowledge acquisition tool of FIG. 4;

DETAILED DESCRIPTION OF THE INVENTION

The preferred embodiment of the present invention and its advantages are best understood by referring to FIG. 1 through 9 of the drawings, like numerals being used for like and corresponding parts of the various drawings.

Figure 1:
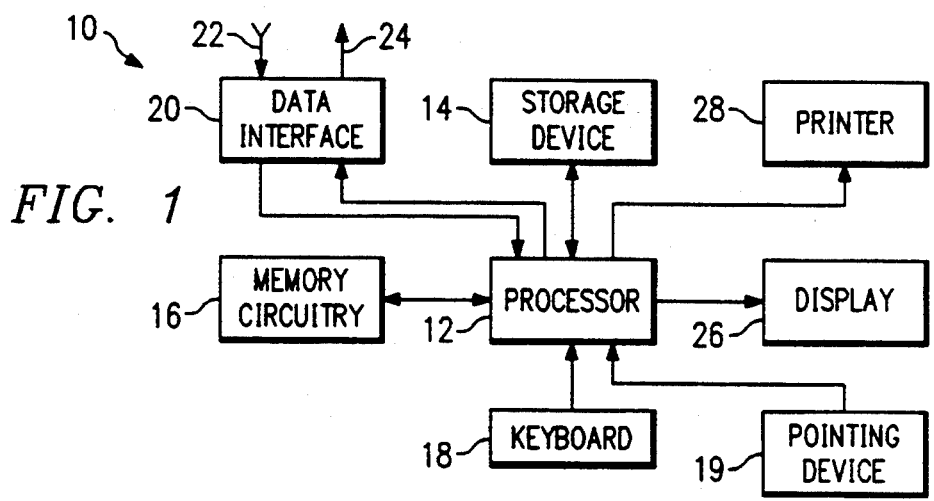
FIG. 1 is a block diagram of process circuitry for specifying an expert system, according to the system and method of the preferred embodiment.

FIG. 1 is a block diagram of process circuitry, indicated generally at 10, for specifying an expert system, according to the system and method of the preferred embodiment. Process circuitry 10 includes a processor 12 programmed in accordance with the preferred embodiment for specifying an expert system. Processor 12 is connected to a non-volatile storage device 14, including fixed and non-fixed storage systems and associated disk controller circuitry. Storage device 14 inputs, stores and outputs data and instructions used by process circuitry 10 in specifying an expert system according to the preferred embodiment. Processor 12 reads data and instructions from storage device 14, as needed, to specify an expert system. Moreover, processor 12 writes data to storage device 14 so that results of the specification process are stored in a non-volatile manner. The specification technique of the preferred embodiment is described further hereinbelow in connection with FIGS. 2–9.

Processor 12 is further connected to a fast-access memory circuitry 16, such as dynamic random access memory ("DRAM"). Memory circuitry 16 inputs, stores and outputs instructions and other frequently accessed data as directed by processor 12 during the specification process. A knowledge engineer (not shown) specifies commands and data to processor 12 using a keyboard 18 and a pointing device 19 such as a mouse, light pen, roller ball, or joystick.

A data interface 20, such as a serial data port or a parallel data port, inputs digital data from an input data path 22. Further, data interface 20 translates data from input data path 22 into a suitable data format for output to processor 12. Similarly, data interface 20 translates data from processor 12 into a suitable data format for output on an output data path 24.

In an exemplary embodiment, data interface 20 connects processor 12 to a network, such that information is shared between process circuitry 10 and other devices connected to data interface 20. For example, data interface 20 can be connected to an optical scanning device via data input path 22, such that process circuitry 10 inputs digital data from the optical scanning device.

Processor 12 displays results of the specification process on a display 26 and prints the results on a printer 28. In the preferred embodiment, process circuitry 10 includes a Sun Microsystems SPARCstation 2 having a UNIX operating system.

Figure 2:
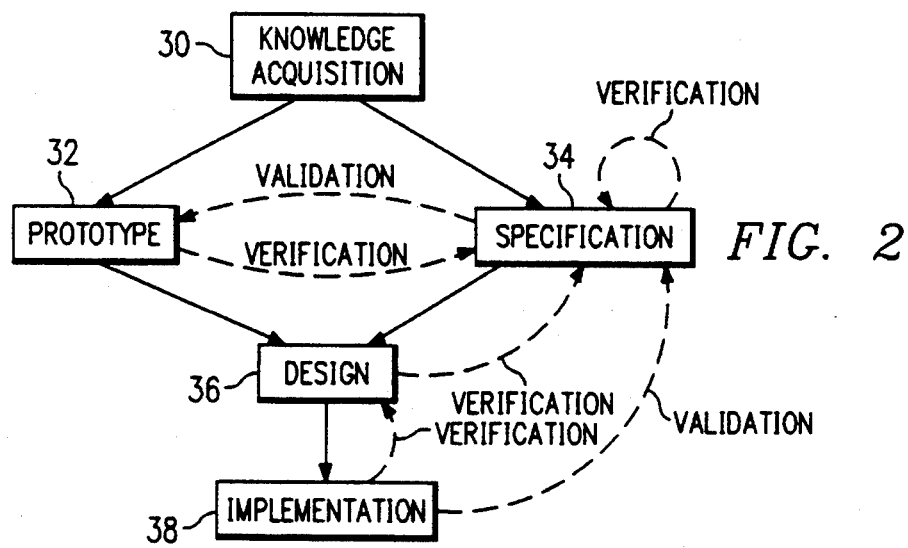
FIG. 2 is a block diagram of an expert system development cycle according to the preferred embodiment.

FIG. 2 is a block diagram of an expert system development cycle according to the preferred embodiment. The development cycle begins at a block 30, where knowledge is acquired from a human expert concerning desired characteristics of an expert system being developed. Based on the knowledge acquisition at block 30, a prototype of the expert system is developed at a block 32, and a specification of the expert system is developed at a block 34. The expert system specification developed at block 34 specifies requirements of the expert system for achieving goals of an end user of the expert system. The development of the prototype at block 32 and the development of the specification at block 34 are performed concurrently. Accordingly, as the design of the prototype is developed at block 32, it is verified for consistency with the specification developed at block 34. After verifying the prototype developed at block 32, the prototype is executed in order to validate that the specification developed at block 34 accurately represents the user's requirements.

Based upon the prototype developed at block 32, and upon the specification developed at block 34, a full-scale design of the expert system is developed at a block 36. The full-scale design developed at block 36 is a scaled-up version of the design of the prototype developed at block 32. Based upon the full-scale design developed at block 36, an implementation of the expert system is developed at a block 38.

Significantly, the specification developed at block 34 advantageously provides a basis upon which verification and validation of the expert system are achieved. Moreover, the specification developed at block 34 advantageously assists in scaling up the prototype design of block 32 to the full-scale design of block 36. Further, the specification developed at block 34 advantageously assists in systematic testing and maintenance of the full-scale design (block 36) and of the implementation (block 38).

Accordingly, after the specification is developed at block 34, the specification itself is verified for internal consistency. If inconsistencies are discovered, the specification is suitably refined. The cycle of verification and refinement of the specification is repeated at block 34 until a sufficient level of verification is achieved.

Similarly, after the full-scale design is developed at block 36, the full-scale design is verified for consistency with the specification. If inconsistencies are discovered, the full-scale design is suitably refined. The cycle of verification and refinement of the full-scale design is repeated at block 36 until a sufficient level of verification is achieved.

After the implementation is developed at block 38, the implementation is verified for consistency with the full-scale design. If inconsistencies are discovered, the implementation is suitably refined. The cycle of verification and refinement of the implementation is repeated at block 38 until a sufficient level of verification is achieved.

After achieving such a sufficient level of verification at block 38, the implementation is validated for consistency with the specification. If inconsistencies are discovered, the cycles of refinement, verification and validation are repeated at blocks 34, 36 and 38, until a sufficient level of validation is achieved.

Figure 3:
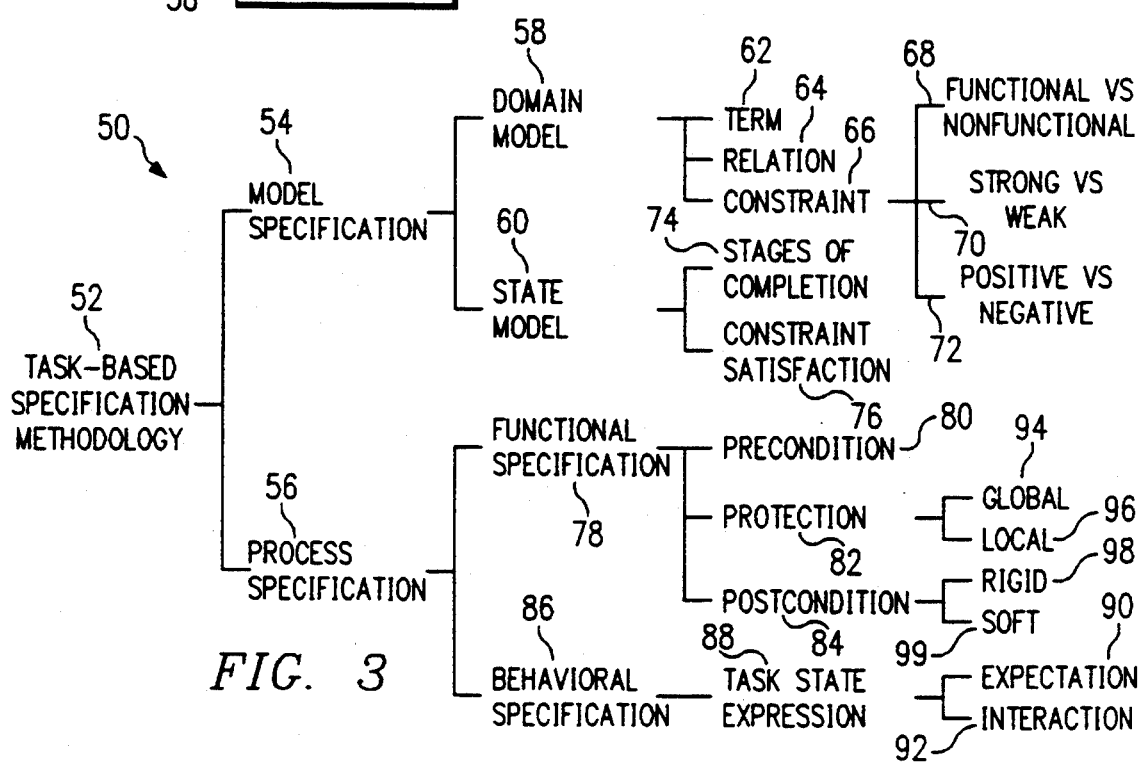
FIG. 3 is an organizational chart of a task-based specification methodology ("TBSM") of process circuitry of the preferred embodiment.

FIG. 3 is an organizational chart, indicated generally at 50, of a task-based specification methodology ("TBSM") 52 of process circuitry 10 of the preferred embodiment. Process circuitry 10 uses TBSM 52 for specifying an expert system at block 34 of FIG. 2. TBSM 52 is organized by process circuitry 10 at block 34 (FIG. 2) around the general concept of tasks, such that a knowledge engineer focuses on generating specifications that are relevant to a given task at any point during the specification process. A task is a functional/process unit of the expert system. Process circuitry 10 advantageously provides TBSM 52 with rigorous formal semantics to facilitate the analysis and verification of a specification developed at block 34 of FIG. 2.

TBSM 52 of process circuitry 10 provides several advantages. First, TBSM 52 is independent of problem solving architectures. Second, TBSM 52 is applicable to a wide range of expert system applications (e.g., classification, synthesis, monitoring and control). Third, TBSM 52 focuses on what the knowledge is, independent of how the knowledge is implemented. Fourth, TBSM 52 introduces major concepts in a gradual manner. Fifth, TBSM 52 facilitates explicit documentations of an expert system's functional requirements. Sixth, TBSM 52 enables explicit documentations of an expert system's intended behavior. Seventh, TBSM 52 supports verification, validation, testing and maintenance.

Toward these objectives, TBSM 52 of process circuitry 10 provides a specification having two primary components: a model specification 54 that describes static properties of the system, and a process specification 56 that describes dynamic properties of the system. The static properties of the system are described in model specification 54 by two models: a domain model 58 for describing domain objects, and a state model 60 for describing problem solving states relevant to a task.

Domain model 58 describes terms 62, relations 64, and constraints 66 that are relevant to a task. Each of terms 62 is a user-defined type that represents either abstract concepts (e.g. configured-backplane) or concrete concepts (e.g. cable length). Each of relations 64 describes a property of one of terms 62 (e.g. has-component) or a relationship between multiple ones of terms 62 (e.g. has-connection).

TBSM 52 of process circuitry 10 distinguishes three dimensions that are useful for categorizing constraints 66.

Dimension 1

Functional vs non-functional constraints 68: A functional constraint is a one-to-one mapping from a set of variables to a constrained variable. A non-functional constraint is a multiple-valued mapping. While a functional constraint can be specified by a technique for determining the constrained variable's value, a nonfunctional constraint can be specified using a predicate description or a function that generates all values satisfying the constraint such as tuples in MOLGEN or interval (e.g. $\chi \in [1,5]$). This distinction affects the problem solving aspects. More specifically, functional constraints deterministically specify the values of the constrained variable, such that a search is not required. By comparison, nonfunctional constraints require a search, due to their non-deterministic nature.

Dimension 2

Strong vs weak constraints 70: A strong constraint provides an order to be obeyed. It can describe a solution or a situation. The specification of a strong constraint can include one or several fixes that describe various ways to repair a violation of the constraint. A weak constraint describes a preference, which provides advice for finding a better solution. Weak constraints are not rigid constraints, such that TBSM 52 of process circuitry 10 is not required to specify a repair method for fixing a violation of these constraints. By distinguishing strong constraints from weak ones, TBSM 52 of process circuitry 10 can verify the consistency between constraints 66 and the postcondition 84.

Dimension 3

Positive vs negative constraints 72: A positive constraint describes legal values of a variable in terms of other variables. A negative constraint is a constraint that describes illegal values of a constrained variable. By providing this distinction, TBSM 52 of process circuitry 10 assists the selection of problem solving methods refined from tasks. For example, positive constraints can be used for proposing for a solution in propose-revise methods, while negative constraints can be used to test a constraint violation.

The second component of model specification 54 describes a state model 60 for describing problem solving states (i.e. partial solutions) in a problem domain of the expert system. State model 60 is a generalization of the concept of flavors in flavor analysis. Flavors are properties of objects which change during execution of a process. With TBSM 52 of process circuitry 10, state model 60 defines (1) the status of an object that reflects various stages of its completion 74 in problem solving, and (2) the dynamic relationships between multiple objects for constraint satisfaction 76.

By defining such terms using components of domain model 58, state model 60 facilitates the description of complex constraints regarding the functionality of a task, because state model 60 simplifies the description of preconditions 80, protections 82, and postconditions 4. State model 60 also enhances the reusability of constraints 66 and simplifies functional specification 78. Accordingly, state model 60 provides a bridge between domain model 58 and a functional specification 78 of process specification 56.

The dynamic properties of the expert system are described in process specification 56 by two specifications: (1) a functional specification 78 using the concept of state transition to explicitly describe the functionality of a task using preconditions 80, protections 82, and postconditions 84, and (2) a behavioral specification 86 specifying the relationships, sequence/intention and interactions of tasks, methods for accomplishing the tasks, and subtasks of the methods using task state expression ("TSE") 88. TSE 88 describes (1) an expectation 90 of desirable sequencing/intention of tasks and of undesirable sequencing/intention of tasks, and (2) an interaction 92 among tasks and methods at different levels.

Process circuitry 10 represents functionality of a task as a sequence of state transitions, and states are specified before, during, and after the operation using precondition 80, protection 82 and postcondition 84 which are partial description of the state. By representing a task as a sequence of state transitions, TBSM 52 of process circuitry 10 specifies "what the functionality is" independent of "how the functionality is achieved". Moreover, process circuitry 10 extends the conventional concept of tasks to capture potentially conflicting functional requirements on a complex operation. Precondition 80 of a task describes the situation under which the task can be invoked.

Protection 82 describes one or more state properties to be maintained at various stages of completion between precondition 80 and postcondition 84 of a task. Accordingly, protection 82 limits coupling between tasks in order to protect state properties that need to be maintained. Protection can be either inherited from a parent task (i.e., global protection 94) or directly specified locally (i.e., local protection 96). Process circuitry 10 verifies locally specified protection against any inherited protection for consistency. The distinction of high level global protection 94 and low level local protection 96 assists verification of multilevel specifications.

Postcondition 84 of a task describes desirable state changes that should be achieved by the task, which can thus be classified into two categories: rigid 98 and soft 99. A rigid postcondition 98 is a condition that must always be satisfied by the states after applying the task. A soft postcondition 99 is a condition that is satisfied for some of the state transitions. By distinguishing rigid 99 from soft 98 postconditions, TBSM 52 of process circuitry 10 represents both minimum and desired functional requirements. Moreover, by distinguishing soft 98 and rigid 99 postconditions, TBSM 52 of process circuitry 10 enables specification of functional requirements that are conflicting in nature.

Process circuitry 10 supports its TBSM 52 with a hypertext-based knowledge acquisition tool: TAME (a Task-based knowledge Acquisition Methodology for Expert systems). Much human knowledge is not well-structured for formal representation and computer processing. In expert systems, adequate explanation requires the storing of knowledge that is highly significant to the user but not necessarily formally generable or processable. In knowledge acquisition, the knowledge elicited from the expert may have to undergo substantial transformation before it can be used in an inference system.

Hypertext systems treat knowledge as having limited structure and processability. Hypertext systems provide a limited structure of links that is intended to aid the user rather than allow computer-based inferencing. The loosely structured representation of knowledge in hypertext systems complements and converges with highly structured representation of knowledge in traditional knowledge-based systems.

TAME provides an integrated environment to acquire and generate specification about the functionality and behavior of an expert system being developed, together with representation of the domain knowledge and domain heuristics for prototype construction. Together, TBSM and TAME of process circuitry 10 enhance the verification, validation, testing and maintenance of an expert system throughout its life cycle.

Figure 4:
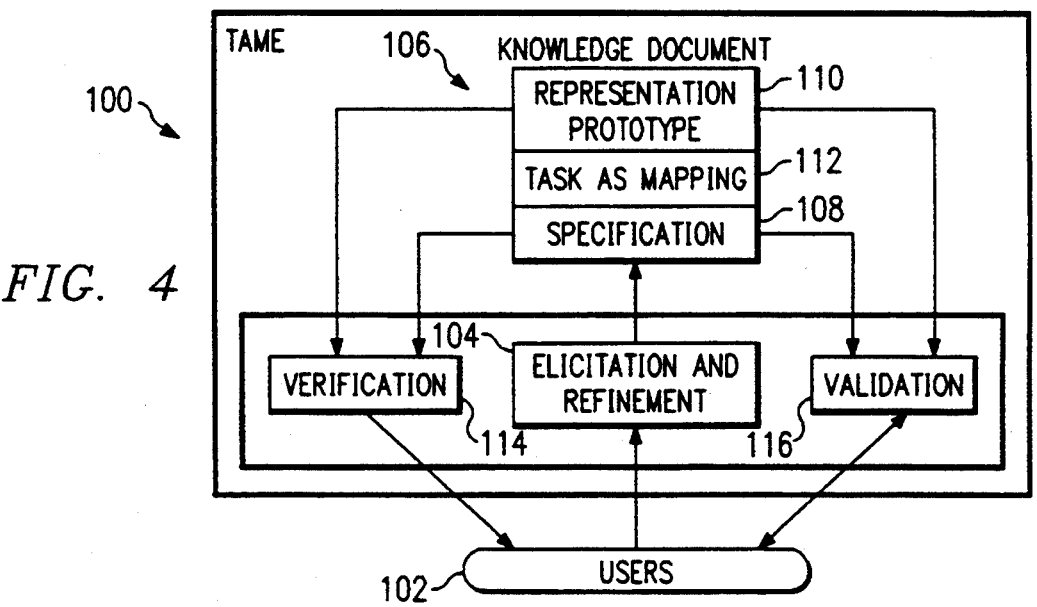
FIG. 4 is a block diagram of structure of a knowledge acquisition tool of process circuitry of the preferred embodiment.

FIG. 4 is a block diagram, indicated generally at 100, of TAME's structure. TAME interacts with one or more users 102 to elicit knowledge at a block 104. The knowledge elicited at block 104 is organized into a knowledge document 106, which includes a specification 108 and a representation prototype 110. Knowledge document 106 depicts the terminology and the relationship among important concepts within a domain, together with the functional and behavioral components. A mapping 112 between specification 108 and representation prototype 110 is established by associating both of them to tasks. Specification 108 is verified at a block 114 for internal consistency based on its formal semantics and is validated at a block 116 as described further hereinabove in connection with FIG. 2. Representation prototype 110 is used to develop a prototype (block 32 of FIG. 2) which is verified at block 114 with specification 108 (block 34 of FIG. 2). The prototype is then executed in order to validate at block 116 that the specification 108 accurately represents the user's requirements. The result of such verification (block 114) and validation (block 116) assists one or more of users 102 in further refining (block 104) specification 108, representation prototype 110, and the structure of tasks 112.

After the knowledge/specification acquisition phase, the verified and validated specification is used for the design and implementation of an expert system as discussed further hereinabove in connection with FIG. 2. Therefore, TAME not only elicits and organizes knowledge and specification into knowledge document 106 but also directly supports down-stream activities in the software life cycle such as implementation, verification, validation, testing and maintenance. Further, TAME and TBSM of process circuitry 10 can be used for reverse engineering, where a human expert's role in forward engineering is replaced by an existing implementation and documentation of the expert system.

TAME is implemented on a KMS hypertext system to support the structure of FIG. 4. KMS is commercially available from Knowledge Systems, 4750 Old William Penn Hwy., Murrysville, Pa. 15668, (412) 241-2240. Accordingly, at block 104, TAME supports both the elicitation and the refinement of the domain knowledge and the system specification 108. As described further hereinbelow in connection with FIGS. 5-6, TAME's browsing and retrieval aids allow users 102 to navigate knowledge document 106 using search, navigation links, a task hierarchy, and an indexing mechanism. Also, TAME provides verification feedback (block 114) by informing users 102 about duplications, incompleteness, and inconsistency in specification 108.

TAME of process circuitry 10 uses templates as basic building blocks and automatic links for the acquisition process to construct knowledge document 106 including (1) specification 108 about the functionality and the behavior of the target system, and (2) representation prototype 110 of the domain knowledge and domain heuristics. Relevant items in different templates are linked using an autolinks facility in hypertext to facilitate easy navigation from one frame to another.

Figure 5:
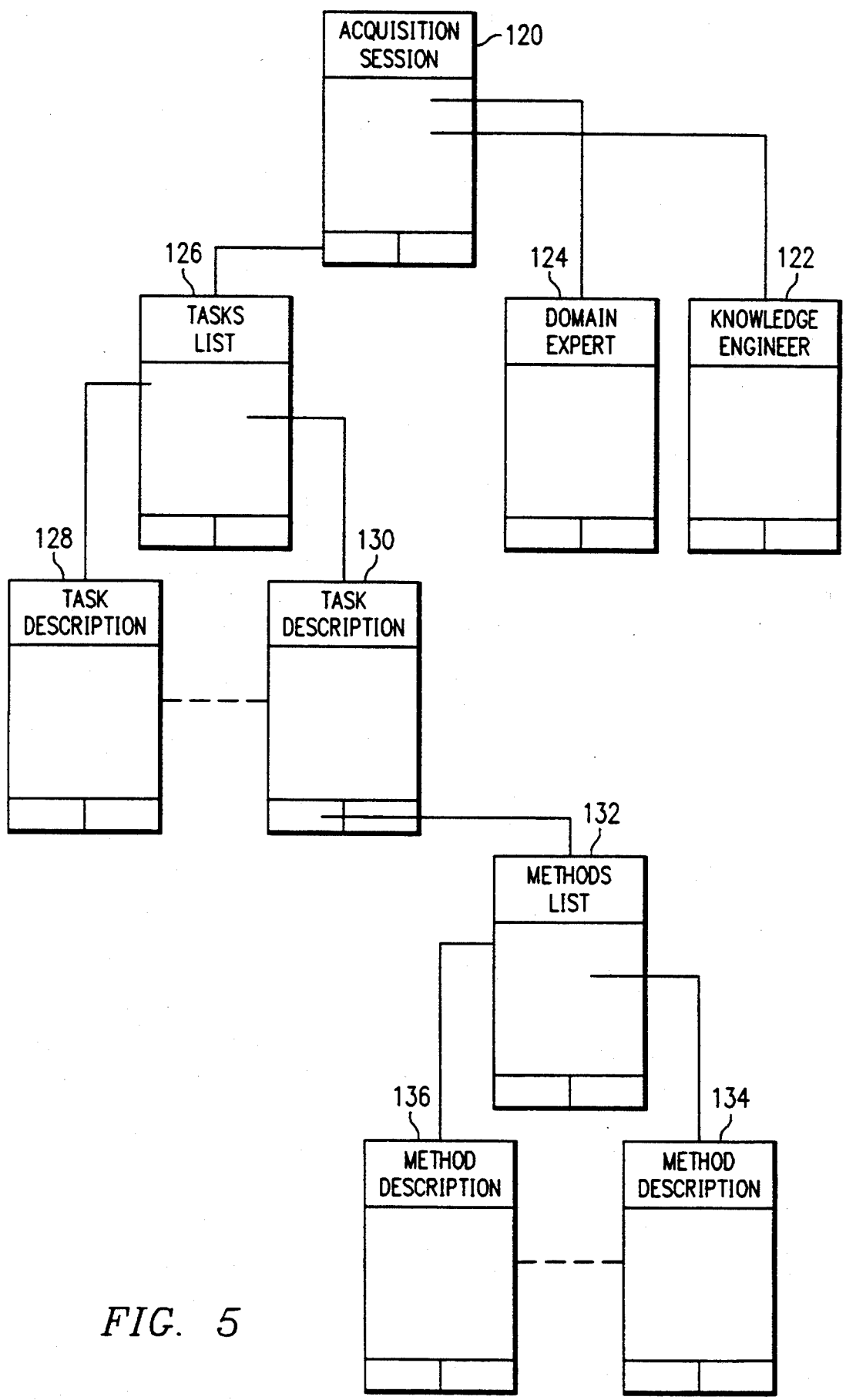
FIG. 5 is a block diagram showing hierarchical structure of major templates of the knowledge acquisition tool of FIG. 4.
Figure 6D:

FIG. 5 is a block diagram showing the hierarchical structure of some major templates of a TAME acquisition session 120. FIGS. 6a–l are exemplary screen displays of TAME templates displayed by process circuitry 10 on display 26 (FIG. 1). Some major types of templates are a project management template 117 (FIG. 6a), an acquisition sessions list template 118 (FIG. 6b), an acquisition session template 120 (FIG. 5 and FIG. 6c), a knowledge engineer template 122 (FIG. 5), a domain expert template 124 (FIG. 5), a tasks list template 126 (FIG. 5 and FIG. 6d), a task description template 128 (FIG. 5) and 130 (FIG. 5 and FIG. 6e), a methods list template 132 (FIG. 5 and FIG. 6f), a method description template 134 (FIG. 5) and 136 (FIG. 5 and FIG. 6g), a domain model template 137 (FIG. 6h), a state model template 138 (FIG. 6i), a state object template 139 (FIG. 6j), and index templates 140 (FIG. 6k) and 141 (FIG. 6l). Users 102 (FIG. 4) specify and refine information in any of the TAME templates using keyboard 18 (FIG. 1) of process circuitry 10.

Users 102 transfer from one template to another by positioning and engaging a display cursor 142 (e.g., FIG. 6a) using pointing device 19 (FIG. 1) of process circuitry 10.

The elicitation process (block 104 of FIG. 4) begins with process circuitry 10 displaying a project management template such as template 117 (FIG. 6a) on display 26 (FIG. 1). As shown in FIG. 6a, project management template 117 elicits and displays several types of information specified by one or more of users 102 (FIG. 4), including a Project Title, Creation Date, Project Version, Revision Date, Type of Domain of the Project, Type of Task of the Project, Sources of Knowledge/Expertise (e.g. Domain Expert), Knowledge Engineer, Status of the Project, and Notes. By positioning and engaging cursor 142 as shown in FIG. 6a at "@ Acquisition Sessions List:" an acquisition sessions list template such as template 118 (FIG. 6b) is displayed in order to provide an overview of all acquisition sessions.

As shown in FIG. 6b, acquisition sessions list template 118 elicits and displays a Session Number, Session Title, and Session ID for each listed acquisition session. By positioning and engaging cursor 142 as shown in FIG. 6b at ". Initial Attempt (Session ID: 1)" the selected acquisition session template 120 (FIG. 6c) is displayed. Alternatively, by positioning and engaging cursor 142 at "@ Project Management Form:" project management template 117 (FIG. 6a) is displayed.

As shown in FIG. 6c, acquisition session template 120 elicits and displays relevant information in a knowledge acquisition session, including a Session Title, Creation Date, Revision Date, Domain Expert interviewed, participating Knowledge Engineer, and Notes. By positioning and engaging cursor 142 at "• Knowledge Engineer:", knowledge engineer template 122 (FIG. 5) is displayed in order to provide additional information concerning the participating knowledge engineer. Similarly, by positioning and engaging cursor 142 at "• Domain Expert:" domain expert template 124 (FIG. 5) is displayed in order to provide additional information concerning the interviewed domain expert. Also, by positioning and engaging cursor 142 as shown in FIG. 6c at "@ Tasks List:" a task list template such as template 126 (FIG. 6d) is displayed in order to provide an overview of all tasks associated with acquisition session template 120. Alternatively, by positioning and engaging cursor 142 at "@ Acquisition Sessions List:" acquisition sessions list template 118 (FIG. 6b) is displayed.

As shown in FIG. 6d, tasks list template 126 elicits and displays a Task Number, Task Title, and Task ID for each listed task. By positioning and engaging cursor 142 as shown in FIG. 6d at "• Configure Unibus (Task ID: 1.1)" the selected task description template 130 (FIG. 6e) is displayed. Alternatively, by positioning and engaging cursor 142 at "@ Parent Session:" acquisition session template 120 (FIG. 6c) is displayed.

As shown in FIG. 6e, task description template 130 elicits and displays relevant information concerning its associated task "Configure Unibus", including a Task Title, Type of Task, Domain Model, State Model, Function, and Behavior. The "Function:" field elicits and displays relevant information concerning the functional specification 78 (FIG. 3) of the task "Configure Unibus", including precondition, protection, and postcondition. Significantly, a task can have multiple postconditions, and the postconditions can be rigid or soft as described further hereinabove in connection with FIG. 3. The "Behavior:" field specifies a task state expression ("TSE") of behavioral specification 86 described further hereinabove in connection with FIG. 3. By positioning and engaging cursor 142 as shown in FIG. 6e at "@ Methods List:" a methods list template such as template 132 (FIG. 6f) is displayed in order to provide an overview of all methods for accomplishing the associated task. Alternatively, by positioning and engaging cursor 142 at "@ Tasks List:" tasks list template 126 is displayed.

Figure 6F:

As shown in FIG. 6f, methods list template 132 elicits and displays a Method Number, Method Title and Method ID for each listed method. By positioning and engaging cursor 142 as shown in FIG. 6f at "• propose-revise (Method ID: 1.1.1), the selected method description template 136 (FIG. 6g) is displayed. Alternatively, by positioning and engaging cursor 142 at "@ Parent Task", task description template 130 (FIG. 6e) is displayed.

As shown in FIG. 6g, method description template 136 elicits and displays relevant information and specification concerning its associated method "proposerevise", including a Method Title, parent task (Method of:), Guard Condition, Subtasks listed for accomplishing the associated method, and TSE described further hereinabove in connection with FIG. 3. The "Subtasks:" field elicits and displays a Subtask Number, Subtask Title, and Subtask ID for each listed subtask. By positioning and engaging cursor 142 as shown in FIG. 6g at "Guard Condition:" a template is displayed for acquiring and displaying relevant information concerning guard condition of the associated method. Also, by positioning and engaging cursor 142 at "• Optimal Configuration (Task ID: 1.1.1.2)" a task description template analogous to template 130 (FIG. 6e) is displayed for the associated subtask "Optimal Configuration". Alternatively, by positioning and engaging cursor 142 at"@ Methods List" methods list template 132 (FIG. 6f) is displayed.

Referring again to FIG. 6e, task description template 130 is linked to both domain model template 137 (FIG. 6h) and state model template 138 (FIG. 6i). Accordingly, by positioning and engaging cursor 142 at "Å Domain Model:" domain model template 137 is displayed. As shown in FIG. 6h, domain model template 137 elicits and displays relevant information concerning the domain model 58 (FIG. 3) of its associated task "Configure Unibus" including a Concept List of domain objects, Relation List of domain relations, and parent task (Domain of:). A concept hierarchy can be established accordingly. By positioning and engaging cursor 142 as shown in FIG. 6h at "@ Parent Task" task description template 130 (FIG. 6e) is displayed.

Referring again to FIG. 6e, by positioning and engaging cursor 142 at "• State Model:" state model template 138 is displayed. As shown in FIG. 6i, state model template 138 elicits and displays relevant information concerning the state model 60 (FIG. 3) of its associated task "Configure Unibus", including parent task (State Object of:), and State Object Name for each listed state object. Moreover, state model template 138 elicits and displays each listed state object as being one of two possible types, namely either a first type for representing constraints or a second type for representing stages of completion. A constraint type state object includes a property list to indicate the property of a constraint (e.g., functional, strong, and positive). By positioning and engaging cursor 142 as shown in FIG. 6i at ", Unconfigured Objects (State Object)", state object template 139 (FIG. 6j) is displayed. Alternatively, by positioning and engaging cursor 142 at "@ Parent Task" task description template 130 (FIG. 6e) is displayed.

As shown in FIG. 6j, state object template 139 acquires and displays information relevant to its associated task "Configure Unibus" and associated state object "unconfigured objects", including Type of State Object, State Object Definition, and parent task (State Object of:). By positioning and engaging cursor 142 as shown in FIG. 6j at "@ State Objects List:" state model template 138 (FIG. 6i) is displayed.

The constructed knowledge document 106 (FIG. 4) can be reviewed and accessed in multiple ways. The description of sessions, tasks, methods, concepts, relations, state objects and rules can be retrieved by name using an index having names arranged in alphabetic order. From any of the TAME templates, users 102 (FIG. 4) can position and engage cursor 142 at "@ TAME Index", such that TAME index template 140 is displayed by process circuitry 10 on display 26 (FIG. 1). TAME index template 140 displays each letter of the alphabet. As shown in FIG. 6k, by positioning and engaging cursor 142 at "*C:" category index template 141 (FIG. 6l) is displayed in order to list all items in knowledge document 106 (FIG. 4) having names beginning with the selected letter of the alphabet.

Moreover, with TAME index template 140, the user can position and engage cursor 142 at "@ TAME Home:" such that process circuitry 10 displays the template from which TAME index template 140 was displayed. As with any of the TAME templates, the user can position and engage cursor 142 at "@ Acquisition Sessions List:" in order to display acquisition sessions list template 118 (FIG. 6b). Likewise, the user can position and engage cursor 142 at "@ Project Management Form:" in order to display project management template 117 (FIG. 6a).

As described hereinabove in connection with FIGS. 5-6, users 102 (FIG. 4) can use links established between TAME templates in order to review an immediate parent task, parent method, and parent acquisition session (i.e., local navigation) or to review a task list, method list, and acquisition session list (i.e., global navigation). In an analogous manner, TAME further enables users 102 (FIG. 4) to construct a task hierarchy as a global map for tasks acquired in the acquisition sessions. A task hierarchy in TAME serves two purposes: 1) to provide an overview of the target system, and 2) to navigate through tasks acquired directly from the hierarchy.

Figure 7A:
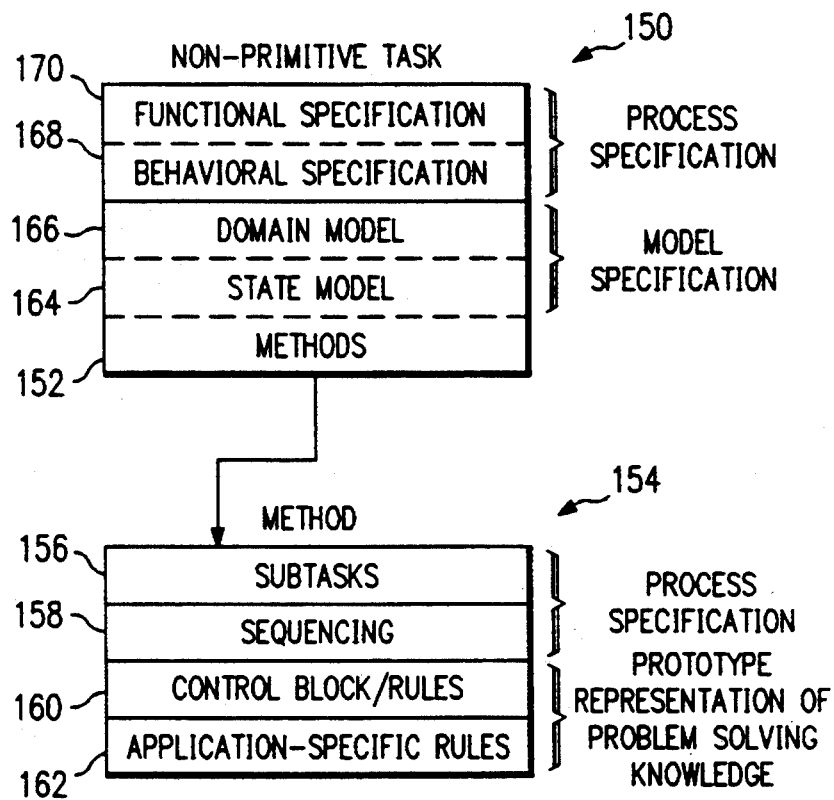
FIG. 7a illustrates a non-primitive task of the preferred embodiment.

A task can be either non-primitive or primitive. FIG. 7a illustrates a non-primitive task, indicated generally at 150. Non-primitive task 150 includes state model 164, domain model 166, behavioral specification 168, and functional specification 170. Non-primitive task 150 can be refined into a set of methods 152 that accomplish the task. Each of the methods, such as a method associated with a method description template 154, can be further refined into subtasks 156. Each method description template has a method level TSE to document desired sequencing 158 among those subtasks of the associated method. Together, subtasks 156 and sequencing 158 form a process specification of the method of template 154. A prototype representation of problem solving knowledge of the method is formed by a control block/rules 160 and a set of an application-specific rules 162. Model specification of non-primitive task 150 is formed by a state model 164 and domain model 166. Process specification of non-primitive task 150 is formed by functional specification 168 and behavioral specification 170. The refinement process is repeated for all non-primitive tasks until only primitive tasks remain.

Figure 7B:
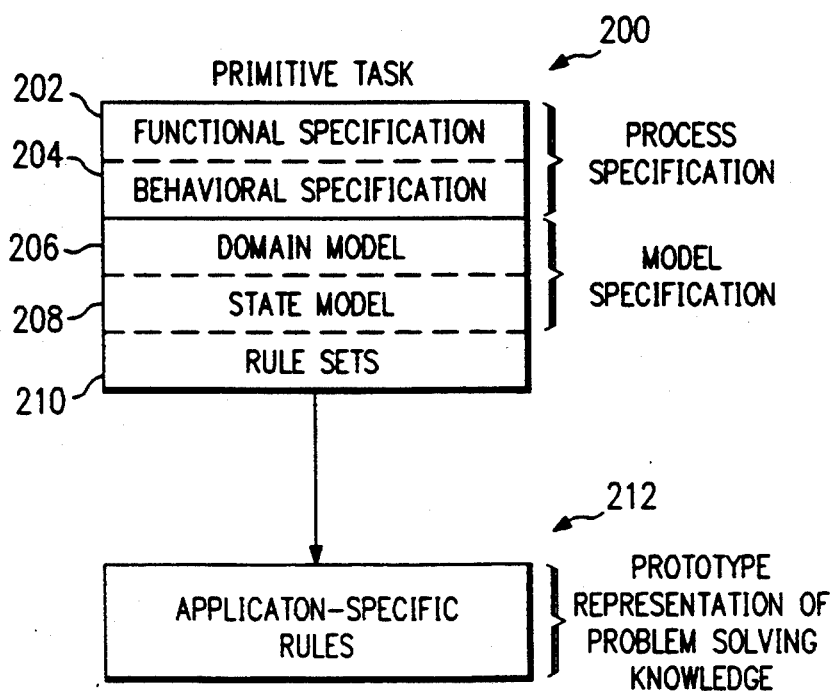
FIG. 7b illustrates a primitive task of the preferred embodiment.

FIG. 7b illustrates a primitive task, indicated generally at 200. Similar to non-primitive task 150, primitive task 200 includes functional specification 202, behavioral specification 204, domain model 206 and state model 208. Unlike non-primitive task 150, primitive task 200 is only refined into a set of rules 210. The format for rule description is informal and is represented in an application-specific rule set template 212.

Referring to project management template 117 of FIG. 6a, TAME provides feedback to users 102 (FIG. 4) regarding incomplete refinement. For example, a user exits TAME by positioning and engaging cursor 142 at "@ Exit TAME". Then, upon returning to TAME, the task hierarchy of each acquisition session can be reviewed by TAME to locate any remaining non-primitive task. If TAME locates such a remaining non-primitive task, then TAME informs the user about the incomplete refinement and offers the user a chance to refine an acquisition session.

Figure 8:
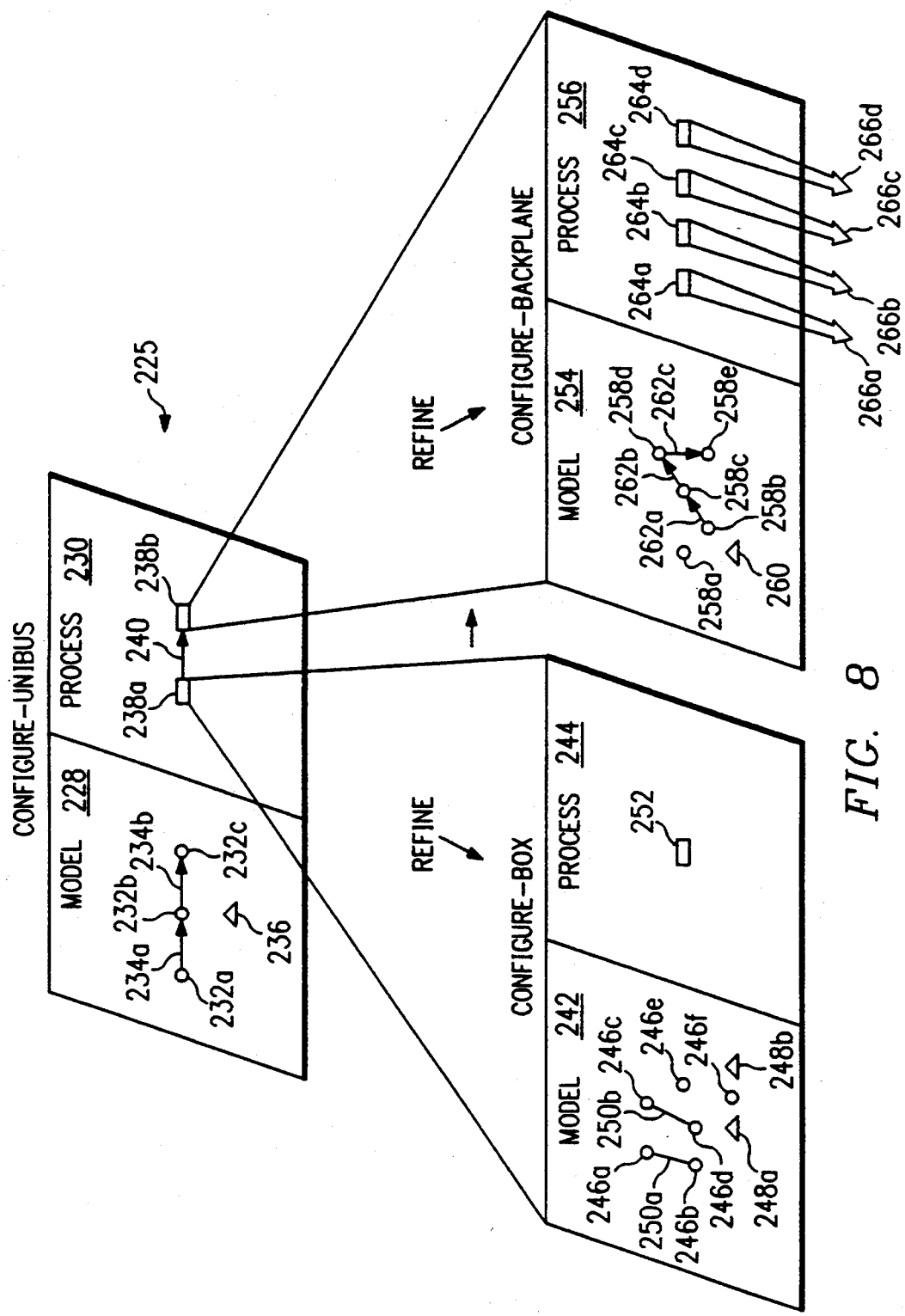
FIG. 8 illustrates an exemplary task/method/subtask relationship used by process circuitry of the preferred embodiment.

FIG. 8 illustrates an exemplary task/method/subtask relationship used by process circuitry 10 to represent a specification at various abstraction levels in a hierarchical multi-layered structure. In FIG. 8, a configure-unibus task 225 includes a model specification 228 and a process specification 230 such as described further hereinabove in connection with FIG. 3. Model specification 228 includes multiple defined terms 232a–c having specified relations 234a–b. Model specification 228 further includes a constraint 236.

Process specification 230 of configure-unibus task 225 includes a method having multiple tasks 238a ("configure-box") and 238b ("configure-backplane") with a specified relation 240. Pieces of high-level abstract specification, such as tasks 238a–b, are refined to more detailed specification at a lower abstraction level according to a task/method/subtask structure, by first refining a task to one or more methods and then refining a method to one or more subtasks. Accordingly, configure-box task 238a is refined to include a model specification 242 and a process specification 244. Model specification 242 includes multiple defined terms 246a–f and constraints 248a–b. Terms 246a and 246b have a specified relation 250a, and terms 246c and 246d have a specified relation 250b. Process specification 244 includes a method having a task 252.

Similarly, configure-backplane task 238b is refined to include a model specification 254 and a process specification 256. Model specification 254 includes multiple defined terms 258a–e and a constraint 260. Terms 258b–e have specified relations 262a–c. Process specification 256 includes multiple tasks 264a–d, each of which specification 256 includes multiple tasks 264a–d, each of which is further refined at a lower abstraction level as indicated by arrows 266a–d of FIG. 8. Accordingly, as the refinement process continues, a more detailed specification of the system's model and process behavior is constructed. During the refinement process, some pieces of the specification can elaborate on models, constraints, or processes at previous levels, while other pieces can be completely new constructs not present in a previous level.

In order to help the knowledge engineer focus on constructing a part of the specification at an appropriate abstraction level, and to avoid overloading the knowledge engineer with excessive detailed information, TBSM and TAME of process circuitry 10 support the refinement of both model specification 54 (FIG. 3) and process specification 56 (FIG. 3). Both the model specification and the process specification can be first described in their high-level abstraction forms, which can be further refined into more detail specifications at lower abstraction levels. Process refinement includes two primary steps:

Step 1. Refine a task into a set of problem solving methods or domain-specific methods that accomplish the task. For example, the task 'select backplane' is refinable to one of the several problem solving strategies: propose-revise, least commitment, or search.

Step 2. Refine a problem solving method or a domain-specific method by specifying subtasks involved and temporal relationship between subtasks using TSE.

In model refinement, concepts are refined together with their relationships. For example, a relation 'connectivity' at the top abstraction level is refinable at the next abstraction level to 'configuring into', which is further refinable at an even lower abstraction level to 'putting models into slots on the backplane'.

Accordingly, using TBSM and TAME, process circuitry 10 specifies an expert system by first constructing a partial task hierarchy which is followed by model and process refinement. The technique for constructing the specification is set forth below:

Step 1. Construct a partial task hierarchy for an overall view of the solution. This information is either derived from initial knowledge acquired from expert or from documentation/references.

Step 2. Select a task and construct abstract specification of the model, constraints, states, and state changes relevant to the task. As the knowledge engineer moves to lower level tasks, more detailed specification about the model and process is constructed by refining their abstract counterparts in the following ways:

Identify terms and relations between terms to form a term hierarchy in the model;

Identify different types of constraints in the system so that system verification can be performed based on the types of constraints;

Identify preconditions, postconditions, and protections of subtasks; and

Identify the sequence/intention and the interaction of subtasks using task state expression.

Step 3. Verify for consistency, redundancy, and completeness in a single layer and between layers of the generated specification.

Step 4. Repeat steps 2 and 3 until all the subtasks identified have been specified.

Ultimately, an overall specification of an expert system is formed for both the model knowledge and the process knowledge. Furthermore, process circuitry 10 identifies missing and incomplete knowledge throughout the specification process.

The specification of knowledge at different abstraction levels forms layers of specifications that are analogous to the layers of modules in modular decomposition. Specifications at different abstraction levels can thus be verified for consistency, completeness, and redundancy. Process circuitry 10 performs verification for consistency and completeness for pieces of the specification within one abstraction level or between multiple levels based upon their formal semantics.

Task structure provides a general framework for representing a wide range of problem solving methods, and state transition is a general approach to specifying tasks. Accordingly, TBSM 52 of process circuitry 10 is practical to map into various artificial intelligence ("AI") architectures and can be applied to a wide range of expert systems. As described further hereinbelow, process circuitry 10 uses formalized semantics for the analysis of task process refinement. Such formalized semantics provide the basis for the verification and validation of a specification developed at block 34 of FIG. 2. Advantageously, TBSM of process circuitry 10 of the preferred embodiment is theoretically sound, since its consistency is automatically verifiable by the formalized semantics described further hereinbelow.

I. BASIC CONCEPTS AND DEFINITIONS

To establish the theoretical foundation for verifying the specification, formal semantics are defined for various components in the specification developed at block 34 of FIG. 2. Each task is modeled by a set of triples $<b, \hat{d}, a>$ where b is the "before state", $\hat{d}$ is the "during state", and a is the "after state." These concepts are formally introduced below.

Definition 1 (State Transition)

A task T is defined as a set of triples $<b, \hat{d}, a>$, where b and a denote the state before and after an invocation of T, respectively, and $\hat{d}$ denotes the sequence of states during the invocation of T.

Definition 2 (Precondition)

A formula $\phi$ is a precondition of a task T, denoted as $B_T$, if and only if $\phi$ is true in state b, for every triple $<b, \hat{d}, a> \in T$.

Definition 3 (Protection)

A formula $\phi$ is a protection of a task T, denoted as $P_T$, if and only if $\phi$ is true in state b, for every triple $<b, \hat{d}, a> \in T$, $\phi$ is true in state sequence $\hat{d}$, and $\phi$ is true in state a.

Definition 4 (Rigid Postcondition)

A formula $\phi$ is a rigid postcondition of a task T, denoted as $R_T$, if and only if for every $<b, \hat{d}, a> \in T$, $\phi$ is true in state a.

Definition 5 (Soft Postcondition)

A formula $\phi$ is a soft postcondition of a task T, denoted as $S_T$, if and only if for some $<b, \hat{d}, a > \in T$, $\phi$ is true in state a.

The following example illustrates the concept of soft postcondition. Consider the task, configure unibus in R1-SOAR. Its soft postconditions are that (1) modules are configured in their optimal ordering, (2) wasted cabinet space and backplane slots are minimal, and (3) additional components that need to be ordered are least expensive. These requirements are "soft" because they cannot be achieved simultaneously. For instance, maintaining the optimal ordering of modules often results in wasted cabinet space and unused backplane slots. In general, the concept of softness can also be applied to precondition. For the same example, after the invocation of task unassigned backplane, a soft postcondition (an initial configuration), can be generated which in turn becomes the soft precondition of optimal configuration.

The technique of treating tasks as state transition allows a knowledge engineer to structure the functionality of a system into the specification. The knowledge engineer must still specify the expected interactions of these functional units (i.e. tasks) before verifying that the behavior of the knowledge base meets the design intention. This is achieved using task state expression (TSE) of TBSM and TAME of process circuitry 10 of the preferred embodiment.

TSE is based on the semantics of regular expression to describe possible task sequence. The concept of conditional paths is also adopted in TSE for even greater control over the selection of tasks in the task sequences. The TSE can be formally defined as follows:

Definition 6 (Task State Expression)

The task state expression, $\epsilon$, over a set of tasks, $\underline{T} = \{T_1 T_2 \ldots T_i \ldots T_n\}$ are defined as follows:
1. $\epsilon$ is a task state expression.
2. For each task $T \in \underline{T}$, (T) is a task state expression.
3. For each expression $\epsilon$, $\beta \epsilon$ is a task state expression, where $\beta$ is a Boolean expression to be attached to a TSE, $\epsilon$, to denote conditional expression.
4. If $\epsilon_i$ and $\epsilon_j$ are task state expressions, then $(\epsilon_i, \epsilon_j)$, $(\epsilon_i; \epsilon_j)$ $(\epsilon_i \vee \epsilon_j)$, $(\epsilon_i)!$, and $[\epsilon_i]$ are task state expressions, where "," denotes immediately follow, ";" denotes follow, "$\vee$" denotes disjunction "!" denotes iteration and "[ ]" denotes optional.

TSEs can be associated either with tasks at a task level (i.e., global TSE) or with methods at a method level (i.e., local TSE). At the task level, TSE is incomplete in nature and is used to document the interaction in between the current task (represented by the operator "+") and other tasks at different levels. At the method level, TSE documents the sequence of subtasks in a method and is assumed to be complete in TBSM.

To specify undesirable interaction between tasks at different levels, two types of behavioral specifications are distinguished: intended and disallowed behaviors. The intended behavior can be specified using a TSE constructed using the operators introduced above. The disallowed behavior can then be described by a TSE preceded by a negation, denoted as $\neg$, outside the TSE to describe undesirable task sequence.

Based on Definitions 1-6, the process specifications of tasks and methods are defined.

Definition 7 (Task Specification)

A specification of a task T is a tuple $<C_T, \epsilon_T>$, where $C_T$ is a quadruple $<B_T, P_T, R_T, S_T 22$, and $\epsilon_T$ is a task state expression involving tasks which have global interaction with T.

As previously mentioned, there are two phases in the process of a task: 1) refine a task into a set of methods that can accomplish the task, and 2) refine a method by specifying subtasks involved and sequence relationship between subtasks using TSE. Therefore, the specification of methods and refinement are formally defined as follows.

Definition 8 (Method Specification)

A method specification of a task T is a quadruple $<T, g, \underline{T}, \epsilon_M>$, where $g$ is a formula describing the guard condition under which the method is applicable, $\underline{T}$ is a collection of subtasks, and $\epsilon_M$ is a TSE involving subtasks in $\underline{T}$.

The state transitions of a method are defined by its specification as follows. First, a concatenation operator is used to construct a set of possible task sequences from the TSE of the method specification. Second, the state transitions of two tasks are concatenated, which can be used to define state transitions of any task sequences. Third, the union of the state transitions of the task sequences forms the state transition of the methods.

A TSE induces a set of possible sequences (paths) of task invocations, which are denoted as task sequences. A task sequences of a TSE $\epsilon$ is one that 1) is in the form of $s_1 \vee s_2 \ldots$ where $s_i = T_j \ldots T_n$, and 2) is equivalent to $\epsilon$. The task sequences of several exemplary TSE's are shown below:

1. $(\epsilon_i, (\epsilon_j \vee \epsilon_k)) \equiv (\epsilon_i, \epsilon_j) \vee (\epsilon_i, ''_k)$.
2. $(\epsilon_i, [\epsilon_j \rightleftharpoons [''_k]) \equiv ''_i \vee (\epsilon_i, ''_j) \vee (\epsilon_i, \epsilon_j, \epsilon_k) \vee (\epsilon_i, \epsilon_k)$.
3. $\epsilon! \equiv \epsilon \vee (\epsilon, \epsilon) \vee (\epsilon, \epsilon, \epsilon) \ldots$ The state transition of a task sequence involving two tasks is formulated as: $ST(T_1, T_2) = \{<b_1, \hat{d}, a> | <b_1, \hat{d}_2, a_1> \in T_1, <b_2, \hat{d}_2, a_{22}> \in T_2$, such that $a_1 = b_2, \hat{d} = \hat{d}_1 \circ a_1 \circ \hat{d}_2$, and $a = a_2$, where $\circ$ is a concatenation operator$\}$. The state transition of any task sequence can thus be defined by applying this definition repeatedly. The state transition of a method is defined as follows.

Definition 9 (State Transition of a Method)

The state transitions of a method specification, $<T, g, \underline{T}, \epsilon_M>$, is the union of state transitions of each task sequence induced by T and $\underline{T}$.

The preconditions, protections, and postconditions of a method M can be defined in a similar way to those of tasks (i.e., Definitions 2-5), and are denoted as $B_M$, $P_M$, $R_M$, and $S_M$, respectively.

Definition 10 (Refinement)

A refinement of a task T (i.e., T's specification is $<C_T, \epsilon_T>$) is a collection of T's method specifications, $\{<T, g_1, \underline{T}_1, \epsilon_{M1}> \ldots <T, g_n, \underline{T}_n, \epsilon_{Mn}>\}$, whose guard conditions are not necessarily disjoint. A refinement of a method M of the task T is a collection of M's subtasks specifications, $\{<C_{T1}, \epsilon_{T1}> \ldots <C_{Tn}, \epsilon_{Tn}>\}$.

A TSE can be described at either the task level (i.e., global TSE) or at the method level (i.e., a local TSE). A TSE at the task level is used to document global interactions between the current task and tasks at different levels that require special attentions in implementing and testing the system. A TSE at the method level documents the local control flow between subtasks of the method. To specify a global interaction, a task-level TSE often uses the "follow" operator (i.e., ";") to describe a partial task sequence. In contrast, a method-level TSE typically does not contain the "follow" operator, and it completely describes the control flow among the method's subtasks. A TSE that does not contain the "follow" operator is referred to as a complete TSE. There is also another difference between the semantics of the task level TSE and the method level TSE. A task level TSE describes expected system behavior when the associated task is invoked. This property plays an important role in combining TSE's at different levels. In TBSM, "+" is used to represent the current task to which a task level TSE is associated. The semantics of the task level TSE implies that it is meaningless to use optional, conditional and selection operators for the task to which the task level TSE is associated.

To verify the consistency of a system's specification, multiple TSEs often need to be combined to obtain a global view of the system's behavior from pieces of local behavior specifications. To achieve this, a composition operator is developed for a task T, denoted as $\oplus_T$, for combining T's TSE, denoted as $\epsilon_T$, and the TSE of T's parent method, denoted as $\epsilon_M$. The composition operator synthesizes $\epsilon_T$ with components of $\epsilon_M$ in which T is always invoked.

The composition of TSEs is illustrated using the following example. Suppose $\epsilon_M = (T_1[T_3])$, $\epsilon_{T3} = (T_3; T_4)$.

$$\epsilon_M \oplus_{T3} \epsilon_{T3} \tag{1}$$

-continued $$= ((T_1) \vee (T_1, T_3)) \oplus_{T_3}(T_3; T_4) \quad (2)$$
$$= (((T_1) \oplus_{T_3}(T_3; T_4)) \vee ((T_1, T_3) \oplus_{T_3}(T_3; T_4))) \quad (3)$$
$$= ((T_1) \vee (T_1, T_3; T_4)) \quad (4)$$
$$= ((T_1, \epsilon) \vee (T_1, T_3; T_4)) \quad (5)$$
$$= ((T_1), (\epsilon \vee (T_3; T_4))) \quad (6)$$
$$= (T_1, [T_3; T_4]) \quad (7)$$

In this example, the task-level TSE is associated with $T_3$. However, $T_3$ is an optional task in its parent method. In order to compose $\epsilon_M$ and $\epsilon_{T_3}$, $\epsilon_M$ be transformed into an equivalent TSE that has two components: one that always invokes $T_3$, the other that does not invoke $T_3$ at all. The composition on $T_3$ thus only has an effect on the former one; the later one remains the same after the composition due to the semantics of the composition operator.

Some general cases of the composition results are shown below.

1. $\epsilon \oplus_T \epsilon_T = \epsilon$, if $\epsilon$ does not contain T.
2. $(\alpha, T, \beta) \oplus_T (T;\omega) = (\alpha, T, \beta; \omega)$
3. $(\alpha, T, \beta_1, \beta_2) \oplus_T (T, \beta_1; \omega) = (\alpha, T, \beta_1, \beta_2; \omega)$
4. $(1 \vee 2)_{TT} = (1_{TT}) \vee 1 (2_{TT})$

II. VERIFICATION OF SPECIFICATIONS

Based on the basic concepts defined in the previous section, the concept of consistency and completeness is formally introduced. Since the specification of an expert system is inherently incomplete, process circuitry 10 distinguishes two types of inconsistencies, namely strong inconsistency and weak inconsistency, using open world assumptions.

For the purpose of verification, it is desirable to compute the description of a state that is obtained by a sequence of task invocations to an initial state description. To achieve this, the progression operator of AI planning is used. A progression operator is a function that maps conditions that are true immediately before a task to conditions that are true immediately after the task.

Definition 11 (Progression Operator)

A progression operator t for a task T is a function mapping from formulas to formulas, such that for every triple $<b, d, a> \in T$, if a formula $\phi$ is true in state b, then $t(\phi)$ is true in state a.

$$\forall <b,\hat{d},a> \epsilon T, b \models \omega \rightarrow a \models t(\omega)$$

Using progression operator of tasks and functional composition (denoted as o), state descriptions after a task sequence can be obtained. For example, if $\phi$ is an initial state description prior to executing the sequence of $T_1, T_2, \ldots, T_n$, then $t_n {}^\circ t_{n-1} {}^\circ \ldots {}^\circ t_1 (\phi)$ is the state description after the task sequence.

Definition 12 (Consistent)

Suppose S be a specification of a system (i.e., a collection of task specifications and method specifications), T be a set of tasks in S, and $\epsilon$ be a TSE involving tasks in T. A specification of a task or a method in S is consistent if and only if for every possible task sequence $T_1 \ldots T_{i-1}T_i \ldots T_n$ induced from $\epsilon$, and $\phi$ is the initial state description prior to executing the sequence, the following consistency hold:

1. The precondition of $T_i$ can be deduced from the state description before performing $T_i$.

$$\forall s, s \models t_{i-1}{}^\circ \ldots {}^\circ t_1(\phi) \rightarrow s \models B_{T_i}$$

2. The postcondition of $T_i$ can be deduced from the description of the state after performing $T_i$.

$$\forall s, s \models t_i{}^\circ t_{i-1}{}^\circ \ldots {}^\circ t_1(\phi) \rightarrow s \models R_{T_i} \vee \models (R_{T_i} \wedge S_{T_i})$$

3. The protection of $T_i$ can be deduced from state descriptions before, after, and during performing $T_i$.

$$\forall s, s \models t_{i-1}{}^\circ \ldots {}^\circ t_1(\phi) \rightarrow S \models P_{T_i}$$

$$\forall s, s \models t_i{}^\circ t_{i-1}{}^\circ \ldots {}^\circ t_1(\phi) \rightarrow s \models P_{T_i}$$

$$\forall s, s \models (t_{i1} \vee (t_{i2}{}^\circ t_{i1}) \vee \ldots \vee (t_{in-1} {}^\circ \ldots {}^\circ t_{i1})){}^\circ t_{i-1}{}^\circ \ldots {}^\circ t_1(\phi) \rightarrow s \models P_{T_i}$$

where $T_{i1} \ldots T_{in}$ is a sequence of $T_i$'s subtasks executed given the initial state description $\phi$.

Definition 13 (Weak Inconsistency)

A task or a method specification in a specification S of a system is weakly inconsistent if not all consistency conditions can be proved.

Definition 14 (Strong Inconsistency)

A task or a method specification in a specification S of a system is strongly inconsistent if the violation of certain consistency conditions can be proved.

Theorem 1 (Weakly Inconsistent Method Specification)

Let M be a method specification of a task T, $<T, g, \underline{T}, \epsilon_M>$. M is weakly inconsistent with $T_i$ if there exists a possible task sequence $T_1 \ldots T_{i-1}T_i \ldots T_n$ induced from the composed TSE of $\epsilon_M$ and the TSEs of its subtasks, and there exists $\phi$, a state description prior to executing the sequence, such that one of the following holds:

1. Precondition of $T_i$ can not always be deduced to be true from the state description after $T_{i-1}$.

$$\exists s, s \models t_{i-1}{}^\circ \ldots {}^\circ t_1(\phi) \wedge s \nvDash B_{T_i}$$

2. Postcondition of $T_{i-1}$ can not always be deduced to be true form the state description before $T_i$.

$$\exists s, s \models t_{i-1}{}^\circ \ldots {}^\circ t_1(\phi) \wedge s \nvDash T_{T_{i-1}}$$

3. Protection of $T_i$ can not always be deduced to be true from the state description before, after or during $T_{i-1}$.

$$\exists s, s \models t_{i-1}{}^\circ \ldots {}^\circ t_1(\phi) \wedge s \nvDash P_{T_i}$$

Or, $$\exists s, s \models t_i{}^\circ t_{i-1}{}^\circ \ldots {}^\circ t_1(\phi) \wedge s \nvDash P_{T_i}$$

Or, $$\exists s, s \models (t_{i1} \vee (t_{i2}{}^\circ t_{i1}) \vee \ldots \vee (t_{in-1}{}^\circ \ldots {}^\circ t_{i1})){}^\circ t_{i-1}{}^\circ \ldots {}^\circ t_1(\phi) \wedge s \nvDash P_{T_i}$$

where $T_1 \ldots T_{i-1}T_{i1} \ldots T_{in}$ is a subsequence of a possible task sequence induced from $\epsilon_M$ and $\phi$.

Theorem 2 (Strongly Inconsistent Method Specification)

Let M be a method specification of a task T, $<T, g, \underline{T}, 8M>$. M is strongly inconsistent with $T_i$ if there exists a possible task sequence $T \ldots T_{i-1}T_i \ldots T_n$ induced from the composed TSE of $\epsilon_M$ and the TSEs of its subtasks, and there exists $\phi$, a state description prior to executing the sequence, such that one of the following holds:

1. Precondition of $T_i$ can sometimes be proven to be false from the state description after $T_{i-1}$.

$$\exists s, s \vDash t_{i-1}^\circ \ldots {}^\circ t_1(\phi) \to s \vDash \neg B_{T_i}$$

2. Postcondition of $T_{i-1}$ can sometimes be proven to be false from the state description before $T_i$.

$$\exists s, s \vDash t_{i-1}^\circ \ldots {}^\circ t_1(\phi) \to s \vDash \neg T_{T_{i-1}}$$

3. Protection of $T_i$ can sometimes be proven to be false from the state description before, after, or during $T_{i-1}$.

$$\exists s, s \vDash t_{i-1}^\circ \ldots {}^\circ t_1(\phi \to s \vDash \neg P_{T_i}$$

Or, $$\exists s, s \vDash t_i^\circ t_{i-1}^\circ \ldots {}^\circ t_1(\phi) \to s \vDash \neg P_{T_i}$$

Or, $$\exists s, s \vDash (t_{i1} \lor (t_{i2}^\circ t_{i1}) \lor \ldots \lor (t_{in-1}^\circ \ldots t_{i1})) {}^\circ t_{i-1}^\circ \ldots {}^\circ t_1(\phi) \to s \vDash \neg P_{T_i}$$

where $T_1 \ldots T_{i-1} T_{i1} \ldots T_{in}$ is a subsequence of a possible task sequence induced from $\epsilon_M$ and $\phi$.

EXAMPLE A.1

Strongly Inconsistent Method Specification

The following example illustrates a strongly inconsistent method specification by showing that both the protection and postcondition could sometimes be deduced to be false.

The rationale underlying this TSE is that if the current module and current backplane are incompatible, then find a backplane suitable for the current module should be performed instead of trying to configure another module using the current backplane, since doing so would not only violate the protection to maintain the optimal ordering of modules, but would also configure the next module before the current one. The task configure a module (Example B.7) in R1/SOAR has a protection that the optimal ordering of modules should be maintained.

From the local TSE of the method, $\epsilon_M = (T_1, [T_2])!$, and the global TSE of $T_1$, $\epsilon_{T_1} = (T_1; [T_3])$ (shown in Example B.7), the following composed TSE is obtained by applying the composition operator: $((T_1, [T_2])!; [T_3])$.

If the TSE is $(T_1, T_2)!$, there is a possibility that it will result in strong inconsistency because the postcondition of configure a module is configured (current-module) $\lor$ incompatible (current-module, current-backplane). Invoking the sequence, $(T_2, T_1)$, incompatibility between current module and current backplane is detected which could lead to configuring the next module before configuring the current one. As a result, it can sometimes be deduced that the current backplane is a moduled backplane, which is inconsistent with the precondition of configure a module, and that the optimal ordering of modules is not maintained. Therefore, it is strongly inconsistent.

Definition 15 (Consistent Refinement)

A refinement of a task T is consistent with T's specification, if and only if the collection of state transition $<b, \hat{d}, a>$ of T's methods is a subset of the collection of T's state transition $<b, \hat{d}, a> \in T$.

Definition 16 (Specificity of Conditions)

A condition $C_1$ is exclusively more specific denoted as $\prec$, than condition $C_2$ if and only if for all states, s, if s satisfies $C_1$, then s satisfies $C_2$, but not vice versa (i.e., they are not equivalent).

$$C_2 \succ C_1 \Leftrightarrow (\quad s, s \vDash C_1 \to s \vDash C_2) \land \neg(\forall s, s \vDash C_2 \to s \vDash C_1)$$

Theorem 3 (Consistent Refinement)

A task specification of T, $<C_T, \epsilon_T>$, and a method specification M of T, $<T, g, \underline{T}, \epsilon_M>$ is consistent refinement if and only if the following hold:
1. $B_T \succeq B_M$.
2. $P_T \succeq P_M$.
3. $R_t \succeq R_M$.
4. $R_T \land S_T \succeq R_M \land S_M$.

where $B_M$, $P_M$, $R_M$, $S_M$ are preconditions, protections, and postconditions that are derived from the method specification.

The following two Corollaries (Corollary 1 and 2) follow immediately from Theorem 3.

Corollary 1 (Inconsistent Refinement)

Suppose a task specification of T, $<C_T, \epsilon_T>$, and a method specification M of T, $<T, g, \underline{T}, \epsilon_M>$. M is an inconsistent refinement of T, if one of the following holds:
1. $B_T \not\succeq B_M$.
2. $P_T \not\succeq P_M$.
3. $R_T \not\succeq R_M$.
4. $R_T \land S_T \not\succeq R_M \land S_M$.

Corollary 2 (Inconsistent Types of Postcondition)

Suppose a task specification T, $<C_T, \epsilon_T>$, and a method specification M of T, $<T, g, \underline{T}, \epsilon_M>$. If $(S^M \succeq R_T \land S_T)$ and $R_M$ is true, then T and $\overline{M}$ are inconsistent type of postcondition.

Theorem 4 (Protection Violation)

A refinement of T is inconsistent, if $\phi$ is protected during task T, there exists a subtask T' of a method M in T's refinement such that the rigid postconditions of T' can deduce $\neg \phi$.

Proof: By Definition 3, protection has to be held for after state of T, it is trivial to show that, by Definition 4, $\exists$ a state s in M's state transition such that $\phi$ is false (i.e. $\neg \phi$ is true).

Assume that the refinement is consistent. Since the state transition of M is a subset of those of Ts, it can be deduced that $\exists$ a state in T's state transition such that the protection $\phi$ is violated, which is contradictory to the definition of protection. Therefore, the assumption does not hold. Thus, the theorem is proved by contradiction.

Theorem 5

Suppose is a global $\epsilon_{T_i}$ is a global TSE of task $T_I$ and T (a lower level task) is in $\epsilon_{T_i}$. A TSE is said inconsistent if T is not in $\epsilon_{T_i}$.

Theorem 6 (Weakly Inconsistent Task Specification)

A task specification, $<C_T, \epsilon_T>$, is weakly inconsistent if some of T's methods is weakly inconsistent method specification.

Theorem 7 (Strongly Inconsistent Task Specification)

A task specification, $<C_T, \epsilon_T>$, is strongly inconsistent if one of the following holds:
1. Some of T's methods is strongly inconsistent method specification.
2. Some of T's methods is inconsistent refinement.

The production of an adequate specification is of particular importance. Detecting errors in specifications avoids faults that are may be difficult to detect and costly to remove in the later phases of an expert system's software life cycle. Verification is, therefore, given special attention in TBSM of process circuitry 10.

The verification of a specification is important because it helps early detection of errors in the software life cycle to produce an adequate specification, thus eliminating possible design failures and reducing product costs. TBSM provides two levels of inconsistency checking: weak inconsistency and strong inconsistency. A system specification is weakly inconsistent if its consistency cannot be proved. On the other hand, a system specification is strongly inconsistent if its consistency can be disproved. Types of errors that could result in an inconsistent process specification include protection violation, precondition violation, postcondition violation, and incorrect TSEs. There are two types of incompleteness: missing methods and incomplete TSEs. A missing method can be detected if the precondition of a task is not covered by its methods. The TSE of a method is incomplete if the TSE does not refer to all of the subtasks of the method.

Process circuitry 10 performs a high level verification technique which iteratively performs the following steps through every task, starting from the highest level task.

Step 1. For every parent method (PM) of T, check if T is consistent with its parent methods, namely, to see if the preconditions of the tasks can be proved or disproved from the method specification.

Step 2. Check if child method (CM) is a consistent refinement with the task T, namely, the state description before, during, and after CM are more specific than the precondition, protection, and postcondition of T.

Step 3. Check T's method specifications to see if they are complete.

Note that the verification technique of process circuitry 10 focuses on one task at a time. The verification of the process specification of each task includes two primary steps. In step 1, the specification of a task T is compared with the method that contains T (which is referred to as T's parent method) and other subtasks in the method to ensure that T's precondition is established either by the precondition of the parent method or by other tasks preceding T in the method. In step 2, the specification of a task T is compared with those methods (and their subtasks) that accomplish T (i.e., T's child methods), for consistency and completeness checking.

The specification of a T's method is consistent with T if (1) the description of the state prior to executing the method, which is referred to as the "before state" description, is semantically more specific than or equal to T's precondition, (2) the description of the state after executing the method, which is referred to as the "after state" description, is more specific than or equal to T's rigid postcondition, and (3) the protection of T is not violated by any subtasks of T. Regarding the completeness checking, a set of T's methods is considered complete if the union of their "before state" descriptions is equivalent to T's precondition.

Accordingly, an important task of the verification technique of process circuitry 10 is to determine the state description prior to or after a task or method is performed by using the functional specification of a task to implement a progression operator, which can be concatenated to compute the state description after a sequence of tasks have been performed.

Step 1 of the verification technique of process circuitry 10 includes the following steps.

Step 1.1. Construct the state description S of the state preceding T using the composed TSE(s) that include T and PM.

Step 1.2. Let C be the precondition of T.

Step 1.3. If C cannot be deduced from S, then inform the user that T's precondition is weakly inconsistent with its parent method.

Step 1.4. If C can be deduced from S, then inform the user that T's precondition is strongly inconsistent with its parent method.

Step 2 of the verification technique of process circuitry 10 includes the following steps.

Step 2.1. For every child method CM of task T,

Step 2.1.1. Construct the state description S1 and S2 of the state before and after the child method CM.

Step 2.1.2. Let C1, C2 and C3 be the precondition, postcondition, and protection of T, respectively.

Step 2.1.3. If S1 is not more specific than C1, or if S2 is not more specific than C2, then inform the user that child method CM is inconsistent with the precondition, postcondition of its parent task T.

Step 2.1.4. For every subtask ST in CM,

Step 2.1.4.1. Construct the state description S3 of the state before ST in CM.

Step 2.1.4.2. If S3 is not more specific than C3, then inform the user that CM is inconsistent with the protection of its parent task T.

Step 2.2. If CM-list is a collection of T's child methods, if Pre-CM is a disjunction of guard conditions and preconditions of child methods in CM list, and if C1 and Pre-CM are not equivalent, then inform the user that CM-list is an incomplete refinement with respect to its parent task T.

Another important feedback capability provided by TBSM and TAME is duplication checking. TAME can inform users about the duplication of sessions, tasks, concepts, relations, state objects, methods, and rules. Duplication is possible for such components because TAME allows different acquisition sessions to share the same task, different tasks to share the same method, and different methods to share the same task. Therefore, knowledge document 106 (FIG. 4) is a network instead of a hierarchy. Duplication checking is thus an important feedback to assist the reuse of components in knowledge document 106.

Moreover, with TBSM and TAME, TSEs at different task and method levels can be combined to form a composed TSE. This allows component interactions specified by TSEs at different levels to be combined into a more complete representation. TAME informs the user about (1) the composed TSE and (2) any inconsistency detected during the composition process. The former gives users a method level view of the task sequences, and the latter notifies users that further refinement is recommended.

The following example is based on a part of R1/SOAR to illustrate how to construct a partial specification by using TBSM. The task configure a box is to configure a moduled backplane (i.e., a backplane with modules) into a box (Example B.1). Here the description in domain model is simplified. Only new domain objects are introduced: systems units, and power in the backplane. In state model, it is complicated because several constraints are involved, including applicable box, acceptable box section, enough power, and boxed backplane The protection—optimal modules' ordering should be maintained, is inherited from the parent task, and is a global protection. Note that there is no TSE listed for this particular task, because no interaction with other tasks is expected.

The method specification (Example B.2) is to illustrate the idea of revising a task. The revised method for the task configure a box can be refined to describe ways of revising a solution if the modules in the backplane require too much power, which becomes the precondition of the repairing tasks: moving to the next section of the same box and moving to a new box. In this method specification, it is preferable to first assign the moduled backplane to the current box section. If it is successful, then the method terminates. Otherwise, if there is a power consumption violation, then it is preferable like to try to move the backplane to the next section in the same box before moving it to a new box.

Note that the TSE in move to a new box documents the interactions with a high level task, $T_4$, optimal configuration. To compose the complete TSE, $\epsilon_r$ of Configure a Box based on this example, first the method level TSE, $\epsilon_M$: $(T_1, [T_2], [T_3])$, is obtained. There is only one TSE at the subtasks level, that is, only the subtask move to a new box has global TSE, $\epsilon_{T_2}$:$(+;[T_4])$. Based on the assumption of completeness of local TSE and incompleteness of global TSE, and the definitions of the operators, the results of composition are derived as follows:

$$\epsilon_M \oplus_{T_2} \epsilon_{T_2} = ((T_1,[T_3]) \vee (T_1,T_2,[T_3])) \oplus T_2(T_2;[T_4])$$
$$= (T_1,[T_2;[T_4]],[T_3])$$

As can be seen from these examples, the refinement process in TBSM and TAME of process circuitry 10 enables the knowledge engineer to gradually reveal the detail of an expert system's model and problem solving knowledge, while simultaneously retaining abstract high-level views.

EXAMPLE B.1

Configure a Box

Task: configure a box
Model Specification:
Domain Model: system units, power in the backplane.
State Model:
  A current box is a box that is currently chosen.
  An applicable box is the box that most recently had a backplane placed in it, as there is still enough room for another one.
  An acceptable box section is the box section that the remaining system units in the section are more than what are to be used by a backplane.
  An enough power, in either the box section or box, is the power in box greater than what modules in moduled backplane require.
  A boxed backplane is the backplane that has already been placed into a box that has enough power.
Process Specification:
Precondition: There exists a current moduled backplane and the current box.
Protection: Optimal modules' ordering must be maintained.
Postcondition:
  (rigid) The chosen moduled backplane is a boxed backplane.

EXAMPLE B.2

Method Refined from Configure a Box

Method: propose-revise
Subtask:
$T_1$: obtain an applicable box as the current box.
$T_2$: configure the moduled backplane to the current box section.
$T_3$: move to the next section of the same box.
$T_4$: move to a new box.
TSE: $(T_1, T_2, [T_3], [T_4])$

EXAMPLE B.3

Move to the next box section

Task: move to the next box section
Model Specification:
Domain Model: positive 5 volt power.
State Model:
  A next section is the box that provides extra system units and positive 5 volt power.
  An unused resource is the resource that is not used for the configuration.
Process Specification:
TSE: $(+; [\text{optimal configuration}])$
Precondition: The modules in the moduled backplane require too much power.
Postcondition:
  (rigid)
  1. The next section provides additional system units and positive 5 volt power.
  2. All the unused resources from the prior section are wasted.

EXAMPLE B.4

Move to a new box

Task: move to a new box
Model Specification:
Domain Model: positive and negative 5 volt power.
State Model:
  A new box is the box that provides additional sections, and positive, negative 5 volt power.
Process Specification:
TSE: $(+; [\text{optimal configuration}])$
Precondition: The modules in the moduled backplane require too much power.
Postcondition:
  (rigid)
  1. The new box provides additional sections, positive and negative 5 volt power.
  2. All the unused resources from the prior box are wasted.

EXAMPLE B.5

Configure Modules

Task: configure as many modules as possible into the current backplane
Model Specification:
Domain Model: module's power drawn, room for current module in the backplane.
State Model:
  A module backplane is a backplane that has as many modules as possible been placed in, namely, there does not exist an unconfigured module or the current module can not be configured into the backplane.

Process Specification:

Precondition: There exists a current backplane, and a sequence of modules.

Protection: Inherited from a parent task.

Postcondition:
(rigid) The chosen backplane is a moduled backplane.

EXAMPLE B.6

A Method of the Task Configure Modules

Method:
Parent Task: Configure Modules
Guard Condition: TRUE
Subtask:
$T_1$: configure a module.
$T_2$: obtain the next module.
TSE: $(T_1, [T_2])!$

EXAMPLE B.7

Configure a Module

Task: configure a module
Model Specification:
Domain Model: module's unibus load, module's pin-type.
State Model:
A moduled backplane is a backplane that has as many modules as possible been placed in, namely, there does not exist an unconfigured module or the current module cannot be configured into the backplane.
A configured board is a board that is placed in a slot.
A configured slot is a slot that has at most one board.
A current module is said to be compatible with the current backplane if:
1. The current module's unibus load is less or equal to the unibus load left.
2. The current module's pin type is the same as the current backplane's pin type.
3. The current module is a kmcll and the backplane is either 4-slot or 9-slot.
4. Modules' power drawn for some type of power is less or equal to the available power of that type.
5. Enough room for the current module in the backplane.
6. Kmc11 modules must always be the last module in a backplane.

Process Specification:
TSE: $(+;[T_3:$ find a backplane suitable for current module])
Precondition: There exists a current module, and a current backplane.
Protection: The optimal ordering of modules should be maintained (inherited).
Postconditions (disjunctive):
(rigid)
1. The current module is compatible with the current backplane and is configured into the current backplane. Each module configured consumes a certain amount of power and uses some of the remaining unibus load. Or, 2. The current module is not compatible with the current backplane, and, the current backplane becomes a moduled backplane.

Modularity is one of the most important criteria for evaluating expert systems specification. In TBSM of process circuitry 10, the inclusion of pre and post conditions is useful in making explicit modularity by comparing the symmetry between pre and post conditions. For example, in the original implementation of R1/SOAR, the task, 'obtain backplane' is a subtask under the, 'configure backplane'. The precondition of 'obtain backplane' is 'a suitable type of backplane' and its postcondition is 'a configured backplane' which are not symmetric to each other. In the exemplary specification of R1/SOAR described further hereinbelow, 'obtain backplane' is placed under 'find a backplane suitable for current module' so that the precondition for 'configure backplane' is changed to 'a suitable backplane' which matches the postcondition symmetrically. This change, from sequential modularity to functional modularity, strengthens the cohesion within the module. A general rule for making an explicit modularity is to compare the pre and post conditions to determine whether they are symmetrical.

Based on an implementation, documentation and source code of R1/SOAR (a major portion of computer configuration expert system R1), a specification was constructed (in a reverse engineering fashion), using TBSM and TAME of process circuitry 10 of the preferred embodiment. The goal was to evaluate the benefits of TBSM and TAME of the preferred embodiment for specifying and documenting various aspects of a real world expert system application such as R1/SOAR. The software SOAR, OPS5, and R1/SOAR is available from Department of Computer Science, Carnegie Mellon University, Pittsburgh, Pa. 15213, (412) 268-2565.

R1/SOAR only performs the unibus configuration task of the entire configuration task of R1. The problem is given a customer's order, place the modules on order into backplanes, and the backplanes into boxes on the correct unibus. The backplanes need to be cabled together, and the panel space allocated when required by the modules. If the containers on order are not sufficient to hold the modules, additional containers must be ordered.

Figure 9:
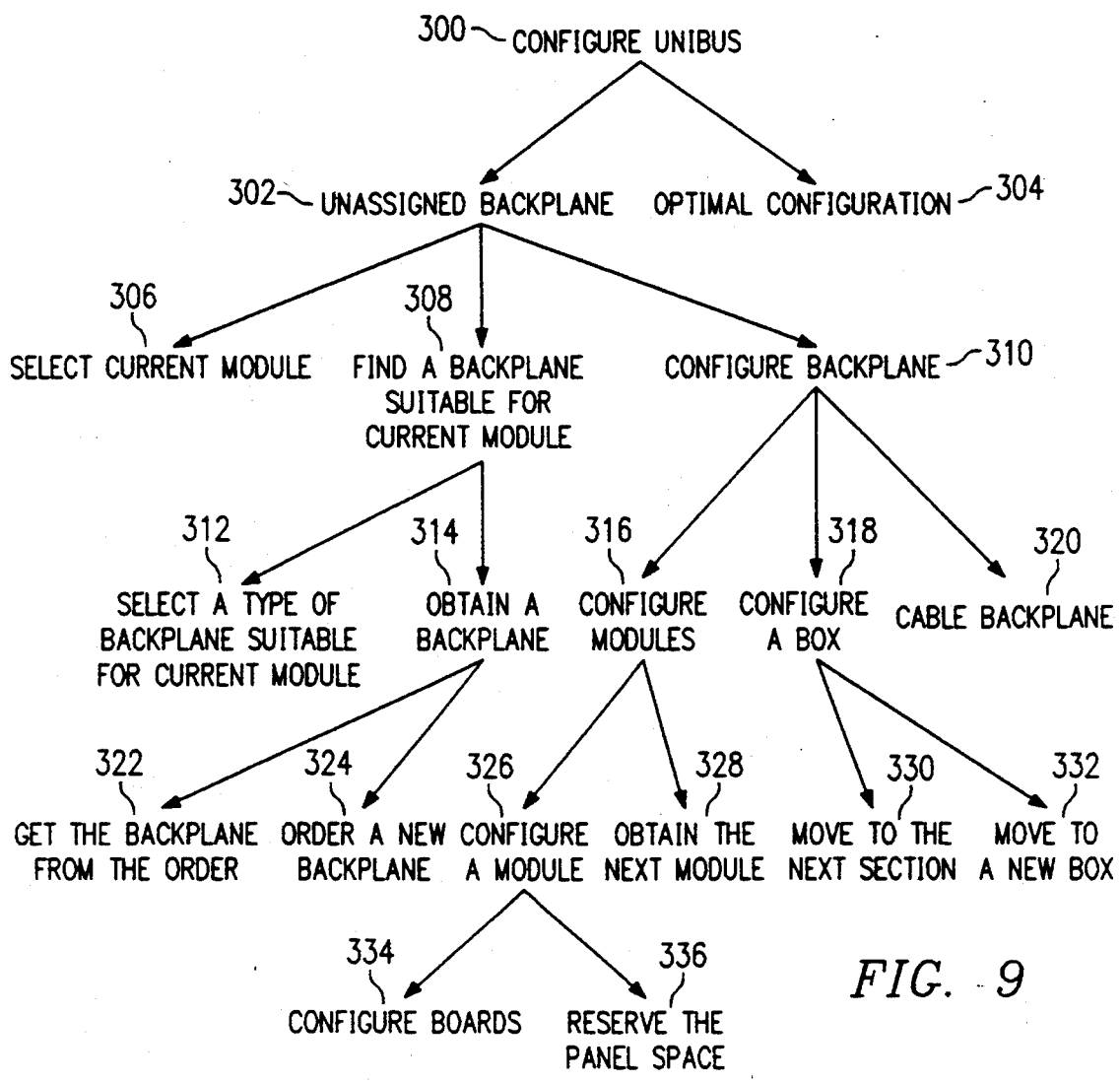
FIG. 9 shows an exemplary partial hierarchy of tasks.

Referring to FIG. 9, tasks involved in R1/SOAR are configure unibus 300, unassigned backplane 302, optimal configuration 304, select current module 306, find a backplane suitable for current module 308, configure backplane 310, select a type of backplane suitable for current module 312, obtain a backplane 314, configure modules 316, configure a box 318, cable backplane 320, get the backplane from the order 322, order a new backplane 324, configure a module 326, obtain the next module 328, move to the next section 330, move to a new box 332, configure boards 334 and reserve the panel space 336, all of which can be organized as a partial task hierarchy as shown in FIG. 9. In a significant aspect of the preferred embodiment, TBSM and TAME of process circuitry 10 advantageously associate such a partial task hierarchy with the specification developed at block 34 (FIG. 2).

Examples below illustrate different types of constraints in R1/SOAR:

A functional, strong, and positive constraint: If the previous backplane is in the same box then use a cable of length 10.

A non-functional, strong, and positive constraint: An RK611 is also a possibility when the pin type is spc, provided that an RK611 module is configured into it at some point.

A functional, strong, and negative constraint: If the remaining unibus length is less than the cable length, the backplane cannot be configured in this position.

A non-functional, strong, and positive constraint: Using a unibus repeater is always a possibility, though it should only be used as a last resort.

In the state model of R1/SOAR, for example, a backplane may be in multiple stages of completion such as "unconfigured backplane", "current backplane", "cabled backplane" or "configured backplane". These terms are defined using objects in the domain model. For example, a "configured backplane" can be defined as a backplane that has modules configured into it, is assigned into a box section, and is cabled with the previous backplane.

An example of state objects satisfying certain constraints in R1 is the concept of 'applicable box' which is defined as 'the box that most recently had a backplane placed in it, and there is still enough room for another backplane' in the box. There are two kinds of constraints involved. The former is a preference constraint, and the latter is a strong constraint.

The inclusion of the state model in specification is useful in simplifying functional specification of expert systems. For instance, once the state object "configured backplane" is defined, postcondition of the task configure a backplane can be defined as "the current-backplane is a configured backplane."

Configure unibus (Example C.1 hereinbelow) is concerned only with very high level domain objects as well as their relationship, such as modules, backplanes, boxes and connection between those objects. Preferably, the state model provides a basis such that an overall view of the target system could be explicitly described. Therefore, the concept of configuration, and optimal configuration are discussed together with the ingredients necessary to describe them, including unconfigured object, configured object, moduled backplane, boxed backplane, cabled backplane, and configured backplane.

An unconfigured object is a given object from the customer's order. A configured module (moduled backplane) is a module that has been placed into the backplane. A configured box (boxed backplane) is a box that has configured modules and configured backplanes in it. A configured backplane is a boxed backplane and cabled with previous backplane (cabled backplane), if one exists. A feasible configuration, based on the above description, thus means that all given domain objects have been configured. An optimal configuration is a configuration that (1) bases on the optimal unibus ordering of modules, (2) wastes minimum space in boxes, and leaves minimum unused slots in backplanes, and (3) requires least expensive components in addition to those of the customer's order, if such components are needed for the configuration.

The process specification of configure unibus will take those unconfigured objects as precondition and either the configuration or optimal configuration as the postcondition, based on whether it satisfies only all the strong constraints or including weak constraints. No requirement needs to be satisfied during this task. Therefore, the protection is null, which is not listed in the construct.

By applying propose-revise method, the task of configure unibus can be further broken down into subtasks unassigned backplane and optimal configuration. The task, unassigned backplane, is to propose an initial configuration. The task, optimal configuration, is to take that initial configuration for optimization (Example C.2)

In unassigned backplane (Example C.3), the goal is to obtain an initial configuration. Namely, all modules have been configured into backplane, and all backplanes are in boxes, and are cabled together. In the initial configuration, the modules and module boards are configured in their optimal unibus ordering. Only the initial configuration needs to be described in the state model, which simplifies the description of postcondition. In the domain model, in addition to modules, backplanes, and boxes, a new concept (boards) is added, and a relation (optimal unibus ordering) is described. In the process specification, the precondition is inherited from that of configure unibus, and the postcondition is an initial configuration. The protection is to prevent boards from different modules being interleaved. This protection is not processed until at the very low level task (i.e. configure boards.)

To accomplish the task, unassigned backplane, the propose method suggests three subtasks involved: select current module, find a backplane for current module, and configure a backplane, and also the temporal ordering in between those subtasks (Example C.4).

To select current module (Example C.5) is a primitive task, such that no subtasks will be further suggested by the method. Therefore, the method is also a primitive method or executable method. More particularly, this suggests that rules or procedural code should be attached to it. The task, find a backplane suitable for the current module, is to choose a backplane and make it current, given that there exists a current module and backplanes and boxes (Example C.6).

In configure a backplane (Example C.7), given a backplane suitable for the current module, unconfigured boxes and modules, the goal is to configure as many of the modules into it as possible (starting from the current one), and put the backplane in a box, and connect via cable to the previous backplane, if one exists. To explicitly describe this problem solving process, the state model is used by distinguishing multiple stages of completion of a configured backplane: moduled backplane, boxed backplane, and cabled backplane.

To refine the task, find a backplane suitable for current module (Example C.8), the proposed method suggests two subtasks: select a suitable type of backplane for current module (Example C.9) and obtain a backplane suitable for current module (Example C.10). Note that, in the original implementation of R1/SOAR, the task obtain a backplane is classified under the parent task, configure a backplane. In the specification, it is changed to be under find a backplane suitable backplane for current module to strengthen the cohesion of modules for both configure a backplane and find a backplane suitable for current module.

A general rule for making an explicit modularity is to compare the pre and post conditions to see if they are symmetrical. For example, in the above example, the precondition of configure a backplane was 'a suitable type of backplane' and the postcondition was 'a configured backplane', which were not consistent. By making the change, the precondition becomes 'a backplane suitable for current module' which is more symmetrical with the postcondition.

In select a suitable type of backplane (Example C.9), there are several constraints involved for selecting a suitable type of backplane. In order to capture those constraints in the specification, a state object is used to reflect the relationship with those constraints. For example, a possible backplane is a backplane that satisfies one of the constraints below, and a suitable backplane is a backplane that satisfies either the first three constraints or just the last one. The following constraints are involved in selecting a suitable type of backplane:
1. If the current module has spc pinning, the 4-slot and 9-slot spc backplane are possibilities.
2. An RK611 backplane is also a possibility when the pin type is spc, provided that an RK611 module is configured into a 4-slot or 9-slot spc backplane. Also, it must always be the always be the last module in the backplane.
3. If the current module does no have spc pining, use the special purpose backplane for that module.
4. Using a unibus repeater is always a possibility, though it should only be used as a last resort.

By representing constraints using state objects, the specification can match with the original documentation very well. For example, in the original English description:
... there is not a unique configuration using the optimal unibus module ordering. For one thing, there is a choice of what kind of backplane to put the next set of modules in when the current backplane is filled ...
which suggests the choice of a type of backplane is uncertain, corresponds directly to the state objects possible backplane and suitable backplane.

To refine the task select a suitable type of backplane, it may be considered as a primitive task. Therefore, an executable method (embodied with either rules or procedural code) can be attached.

To configure a backplane, it may need to be subdivided into several subtasks: configure as many modules as possible into the current backplane, configure a box, cable backplane, and follow that sequence for arranging the temporal ordering (Example C.11).

In the configure as many modules as possible into the current backplane, the postcondition is that the chosen backplane is a moduled backplane. To capture the information 'as many as possible', the state object moduled backplane is used to represent a situation under which there does not exist an unconfigured module or the current module cannot be configured into the backplane (Example C.12).

In configure a box (Example C.13), there are two new domain objects introduced: systems units, and power in the backplane. In state model, it is complicated because several constraints are involved in the state objects, including applicable box, acceptable box section, enough power, and boxed backplane.

Cable backplanes (Example C.14) is another task which has several constraints involved. Once again, state objects assume the responsibility to capture the important information, such as the notion of correct cable length, cabled backplane, enough unibus length and enough remaining unibus load, electrical length. The following are original English description:
... If the previous backplane is in the same box, use a cable of length 10, else use length 120. If the remaining unibus length is less than the cable length, the backplane cannot be configured in this position. The same is true if the backplane requires more than the remaining unibus load or electrical length. Unibus repeaters are used to provide additional load capacity and electrical length ...

Obtain a backplane suitable for current module can be achieved either by obtaining it from the order or by ordering a new one (Example C.15) To refine configure as many modules as possible into current module, two subtasks are involved: configure a module and obtain the next module. The iteration continues until the current module cannot be configured into the current backplane (Example C.16).

In configure a module, there are several low level physical objects that need to be considered in the domain model, which are module's unibus load, and module's pintype. Also, a key word compatible is used here to characterize the relationship between current module and current backplane which are represented using constraints. The restriction on putting boards into slots is captured using configured board and configured slot. The consequence of applying this task is represented in the postcondition: each module configured consumes a certain amount of power and uses some of the remaining unibus load (Example C.17).

Obtain next module is another executable method, which needs no further break-down (Example C.18). Again, obtain an applicable box, like the task obtain a backplane suitable for current module, can be achieved either by obtaining the box from the order or by ordering a new one. Those two tasks can be considered as primitive tasks which have executable methods attached.

The following method illustrates the function of revise a task. The revise method for the task 'configure a box' (Example C.20) can be refined to describe ways to revise a solution if the modules in the backplane require too much power (Example C.19): 'moving to the next section of the same box' and 'moving to a new box'. These two subtasks, which result from the refinement of propose-revise, need to be further elaborated.

A more detailed description of 'moving to a new box' and its consequence is as follows: (Example C.21)
Moving to a new box provides additional sections, and additional positive and negative 15-volt power, but also wastes any unused resources from the prior box.

A more detailed description of the postcondition of the task 'moving to the next section of the same box', is shown below: (Example C.22)
Moving to the next section provides additional system units and positive 5-volt power, but wastes any unused resources from the prior section.

The task state expressions for both tasks describing the interaction with a high level task, optimal configuration, illustrate that the necessary condition for optimization process is unused resources wasted in configure unibus. To configure a module, two subtasks need to be applied: configure boards, and reserve panel space (Example C.23)

Without explicit specification, the distinction between configure boards and configure a module may be obscure. However, in the specification, the distinction is clearly in between, because configure a module concerns only the relationship between current module and current backplane. Thus, the key word compatible is used to characterize that relationship. However, configure boards concerns whether a board is fit with a slot (Example C.24). To break down configure boards (Example C.25), it may be necessary to put a board into a slot, and then proceed to the next slot, which is again primitive task. Therefore, executable methods should be attached to accomplish the task.

EXAMPLE C.1

Configure Unibus

Task: configure unibus
Model Specification:
Domain Model: module, backplane, unibus, box.
State Model:
- An unconfigured object is the object that is given in the customer's order.
- A configured object is the object that is configured into the correct place.
- Moduled backplanes are backplanes that are a kind of configured objects and all given modules are configured into compatible backplane.
- Boxed backplanes are boxes that are a kind of moduled backplanes and all backplanes are in compatible boxed on the correct unibus.
- A cable backplane is a backplane that is a kind of boxed backplane and is cabled with previous backplane, if there is one.
- A feasible configuration is all given domain objects have been configured.
- An optimal configuration is a configuration that (1) bases on the optimal unibus ordering of modules, (2) wastes minimum space in boxes and minimum unused slots in backplanes, and (3) requires least expensive components in addition to those of the customer's order, if such components are needed for the configuration.

Process Specification:
Precondition: There exists a sequence of unibus modules ordered based on their optimal configuration sequence.
Postcondition:
- (rigid) There exists a configuration in which all backplanes are cabled backplanes.
- (soft) There exists a configuration that is an optimal configuration.

EXAMPLE C.2

Method Refined from Configure Unibus

Method: propose-revise
Subtask:
unassigned backplane.
optimal configuration.
TSE: (unassigned backplane, optimal configuration)

EXAMPLE C.3

Unassigned Backplane

Task: unassigned backplane
Model Specification:
Domain Model: boards.
State Model:
- An initial configuration is a configuration in which modules and boards in backplanes are in optimal ordering.

Process Specification:
Precondition: There exists a sequence of modules, backplanes, and boxes.
Protection: The optimal ordering of modules should be maintained.
Postcondition:
(rigid) There exists an initial configuration.

EXAMPLE C.4

Method Refined from Unassigned Backplane

Method: propose
Subtask:
select current module.
find a backplane for current module.
configure a backplane.
TSE: (select current module, find a backplane for current module, configure a backplane)!

EXAMPLE C.5

Select Current Module

Task: select current module
Model Specification:
State Model:
- A current module is the module that is currently chosen.

Process Specification:
Precondition: There exists a sequence of backplanes, modules, and boxes.
Protection: Inherited from parent task.
Postcondition:
(rigid) A module from the given sequence of modules is randomly chosen as the current module.

EXAMPLE C.6

Find a Backplane Suitable for the Current Module

Task: find a backplane suitable for the current module
Model Specification
State Model:
- A current backplane is the backplane that is currently chosen.

Process Specification
Precondition: There exists a current module, a sequence of backplanes and boxes.
Protection: Inherited from parent task.
Postcondition:
(rigid) A backplane suitable for current module is selected.

EXAMPLE C.7

Configure A Backplane

Task: configure a backplane
Model Specification
State Model:
- A configured backplane is the backplane that is moduled backplane, boxed backplane, and cabled backplane.

Process Specification
Precondition:
1. There exists a backplane suitable for current module.
2. There exists unconfigured boxes and modules.
Protection: Inherited from parent task.
Postcondition:
(rigid) A current backplane is a configured backplane.

EXAMPLE C.8

Method Refined from Find a Backplane Suitable for the Current Module

Method: propose
Subtask:

select a suitable type of backplane for current module.
obtain a backplane suitable for current module.
TSE: (select a suitable type of backplane, obtain a backplane suitable for current module)!

EXAMPLE C.9

Select a Suitable Type of Backplane for Current Module

Task: select a suitable type of backplane for current module
Model Specification:
Domain Model: unibus repeater, spc pintype, 4-slot backplane, 9-slot backplane, rk611, special purpose backplane.
State Model:
 A possible backplane is the backplane that satisfies any of the following constraints.
 A suitable backplane is a backplane that satisfies either the first three constraints below or just the last one.
  1. If the current module has spc pinning, the 4-slot and 9-slot spc backplane are possibilities.
  2. An RK611 backplane is also a possibility when the pin type is spc, provided that an RK611 module is configured into a 4-slot or 9-slot spc backplane
also, it must always be the last module in the backplane.
  3. If the current module does not have spc pinning, use the special purpose backplane for that module.
  4. Using a unibus repeater is always a possibility, though it should only be used as the last resort.
Process Specification:
Precondition: There exists backplanes, boxes, and a sequence of modules.
Postcondition:
 (rigid) A type of backplane suitable for current module is selected as the current backplane.

EXAMPLE C.10

Obtain a Backplane Suitable for Current Module

Task: obtain a backplane suitable for current module
Process Specification:
Precondition: There exists a type of backplane suitable for current module.
Postcondition:
 (rigid) A backplane suitable for current module is chosen.

EXAMPLE C.11

Method Refined from Configure a Backplane Method: propose

Subtask:
configure as many modules as possible into the current backplane.
obtain an applicable box.
configure a box.
cable backplane.
TSE: (configures as many modules as possible into the current backplane, obtain an applicable box, configure a box, cable a backplane)!

EXAMPLE C.12

Configure as Many Modules as Possible into the Current Backplane

Task: configure as many modules as possible into the current backplane
Model Specification:
Domain Model: module's power drawn, room for current module in the backplane.
State Model:
 A moduled backplane is a backplane that has as many modules as possible been placed in, namely, there does not exist an unconfigured module or the current module cannot be configured into the backplane.
Process Specification:
Precondition: There exists a current backplane, and a sequence of modules.
Protection: Inherited from parent task.
Postcondition:
 (rigid) The chosen backplane is a moduled backplane.

EXAMPLE C.13

Configure a box

Task: configure a box
Model Specification:
Domain Model: system units, power in the backplane.
State Model:
 A current box is a box that is currently chosen.
 An applicable box is the box that most recently had a backplane placed in it, as there is still enough room for another one.
 An acceptable box section is the box section that the remaining system units in the section are more than what are to be used by a backplane.
 An enough power, in either the box section or box, is the power in box greater than what modules in module backplane require.
 A boxed backplane is the backplane that has already been placed into a box that has enough power.
Process Specification:
Precondition: There exists a current moduled backplane and current box.
Protection: Inherited from the parent task.
Postcondition:
 (rigid) A chosen moduled backplane is a boxed backplane.

EXAMPLE C.14

Cable Backplanes

Task: cable backplanes.
Model Specification:
Domain Model: cable, cable length, cable length of 10, cable length of 120, unibus length, unibus load, electrical length.
State Model:
 A cabled backplane is a backplane that is cabled with previous backplane with correct cable length and enough unibus length for the cable, remaining unibus load and electrical length.
 A correct cable length to use is determined by (1) if the current backplane and previous backplane are in the same box, then use cable length of 10, and (2) if the current backplane and previous backplane are in different boxes, then use cable length of 120.

An enough unibus length for the cable is the unibus length that is greater than cable length.

An enough remaining unibus load and electrical length is the load and electrical length that are greater than what the current backplane requires.

Process Specification:
Precondition: There exists a previous backplane, and a current backplane.
Protection: Inherited from parent task.
Postcondition:
(rigid) The chosen backplane is a cabled backplane.

EXAMPLE C.15

Method Refined from Obtain a Backplane Suitable for Current Module

Method: propose
Subtask:
get the backplane from the order.
order a new backplane.
TSE: (get the backplane from the order, order a new backplane)

EXAMPLE C.16

Method Refined from Configure as Many Modules as Possible into Current Backplane Method: propose
Subtask:
configure a module.
obtain the next module.
TSE: (configure a module, obtain the next module)

EXAMPLE C.17

Configure a Module Task: configure a module
Model Specification:
Domain Model: module's unibus load, module's pin-type.
State Model:
A configured board is a board that is placed in a slot.
A configured slot is a slot that has at most one board.
A current module is said to be compatible with the current backplane if
1. the current module's unibus load is less or equal to the unibus load left.
2. the current module's pin type is the same as the current backplane's pin type.
3. the current module is a kmc11 and the backplane is either 4-slot or 9-slot.
4. Module's power drawn for some type of power is less or equal to the available power of that type.
5. Enough room for the current module in the backplane.
6. Kmc11 modules must always be the last module in a backplane.

Process Specification:
Precondition: There exists a current module, and a current backplane.
Protection: Inherited from parent task.
Postcondition:
(rigid)
1. Each modules configured consumes a certain amount of power and uses some of the remaining unibus load.

EXAMPLE C.18

Obtain the next module

Task: obtain the next module
Process Specification:
Precondition: There exists a sequence of modules.
Postcondition:
(rigid) A module is chosen as the current module.

EXAMPLE C.19

Method Refined from Obtain an Applicable Box

Method: propose
Subtask:
get the box from the order.
order a new box.
TSE: (get a box from the order $\vee$ order a new box)

EXAMPLE C.20

Method Refined from configure a Box

Method: revise
Subtask:
obtain an applicable box as the current box,
configure the moduled backplane to the current box section.
move to the next section of the same box.
move to a new box.
TSE: (obtain an applicable box as the current box, configure the moduled backplane to the current box section, [move to the next section of the same box], [move to a new box].

EXAMPLE C.21

Move to the next box section

Task: move to the next box section
Model Specification:
Domain Model: positive 5 volt power.
State Model:
A next section is the box section that provides extra system units and positive 5 volt power.
An unused resource is the resource that are not used for the configuration.
Process Specification:
TSE: (+; [optimal configuration])
Precondition: The modules in the moduled backplane require too much power.
Postcondition:
(rigid)
1. The next section provides additional system units and positive 5 volt power.
2. All the unused resources from the prior section are wasted.

EXAMPLE C.22

Move to a new box

Task: move to a new box
Model Specification:
Domain Model: positive and negative 5 volt power.
State Model:
A new box is the box that provides additional sections, and positive, negative 5 volt power.
Process Specification:
TSE: (+; [optimal configuration])
Precondition: The modules in the moduled backplane require too much power.
Postcondition:
(rigid)

1. The new box provides additional sections, positive and negative 5 volt power.
2. All the unused resources from the prior box are wasted.

EXAMPLE C.23

Method Refined from Configure a Module Method:
Subtask:
configure boards.
reserve panel space.
TSE: (configure boards, reserve panel space)

EXAMPLE C.24

Configure Boards

Task: configure boards
Model Specification:
Domain Model: slots, boards, width of slot, width of board, pintype of slot, pintype of board.
State Model:
A board is said to be fit into a slot if the pin type of a board is the same as that of a slot and the width of a board is less or equal to that of a slot.
A current board is the board in the current module that currently selected.
An initial slot is the first empty slot in the backplane into which a board can go.
A current slot is the slot in the current backplane currently selected.
Process Specification:
Precondition: There exists the current module, and current backplane.
Protection:
1. Boards from different modules should not be interleaved.
2. All of a modules' boards must go in the same backplane.
Postcondition:
(rigid) All boards in the current module are put into slots in the current backplane.

EXAMPLE C.25

Method Refined from Configure Boards

Method: propose
Subtask:
put board into slot.
go to the next slot.
TSE: (put board into slot, go to the next slot)!
To summarize the result of evaluation for TBSM of process circuitry 10,
it facilitates the making of explicit modularity,
it helps in strengthening the cohesion within a module, and limiting the coupling between modules,
it illustrates the verification capability in identifying the consistency, redundancy, and completeness components.

TBSM also has implication in the implementation, since the specificity of a guard condition attached to each method can be used for method-dispatching among a set of methods in a task. Soft preconditions also have implication in the method implementation. They provide advice for implementing a method whose guard condition is soft precondition. Each soft precondition can be treated as a special case (i.e., a method). For example, the task optimal configuration in R1/SOAR could have a special method whose guard condition is: an initial configuration and no unused waste space, which is a soft precondition indicating that it is not necessary to perform any further optimal configuration because the current configuration is already an optimal one.

Although the present invention and its advantages have been described in detail, it should be understood that various changes, substitutions and alterations can be made herein without departing from the spirit and scope of the invention as defined by the appended claims.

What is claimed is:

1. A system for specifying an expert system, comprising:
  circuitry for generating a plurality of task specifications for specifying tasks as functional units of the expert system;
  circuitry for generating a plurality of method specifications for specifying a plurality of methods identifying a plurality of ways for accomplishing ones of said tasks;
  circuitry for specifying at least one said task as a subtask of a selected one of said methods, such that ones of said task specifications are organized as a structure having multiple levels of said tasks;
  circuitry for generating at least one task level task state expression specifying an interaction between a first one of said tasks at a first level of said structure and a second one of said tasks at said second level of said structure;
  circuitry for generating at least one method level task state expression specifying a control flow between each said subtask of said selected one of said methods, wherein one of said first and second tasks is a particular subtask of a particular one of said methods;
  combining circuitry for combining said task level task state expression with said method level task state expression to establish a combined task state expression; and
  verifying circuitry for verifying whether said particular subtask is consistent with said particular method in response to said combined task state expressions.

2. The system of claim 1, wherein said verifying circuitry is operable to determine whether said particular subtask is weakly inconsistent with said particular method.

3. The system of claim 1, wherein said verifying circuitry is operable to determine whether said particular subtask is strongly inconsistent with said particular method.

4. A system for specifying an expert system, comprising:
  circuitry for generating at least one task specification for specifying a task as a functional unit of the expert system, said task being represented as a precondition state of the system before invocations of said task, and a postcondition state of the system after said invocations;
  circuitry for generating a state model including a plurality of state objects each representing a state of completion in a problem domain of the expert system; and
  circuitry for specifying said precondition state and postcondition state relative to said state objects.

5. The system of claim 4 and further comprising circuitry for generating a model specification of said task including said state model and a domain model specifying domain objects of said task.

6. The system of claim 5 wherein said model specification generating circuitry is operable to form said domain model specifying at least one term relevant to said task.

7. The system of claim 6 wherein said model specification generating circuitry is operable to form said domain model specifying a relation relevant to said task.

8. The system of claim 7 wherein said model specification generating circuitry is operable to form said domain model specifying a relationship between multiple ones of said term.

9. The system of claim 7 wherein said model specification generating circuitry is operable to form said domain model specifying a property of at least one said term.

10. The system of claim 5 wherein said model specification generating circuitry is operable to form said state model specifying at least one relationship between multiple objects.

11. The system of claim 10 wherein said model specification generating circuitry is operable to form said domain model specifying at least one constraint on said relationship.

12. A system for specifying an expert system, comprising:

circuitry for generating at least one task specification for specifying a task as a functional unit of the expert system, said task being represented as a precondition state of the system before invocations of said task, and a postcondition state of the system after said invocations; and circuitry for specifying said postcondition state as a soft postcondition state, such that said soft postcondition state is true after less than all of said invocations.

13. The system of claim 12 and further comprising circuitry for specifying an additional postcondition state as a rigid postcondition state, such that said rigid postcondition state is true after all of said invocations.

14. The system of claim 12 wherein said task specification generating circuitry is operable to form said task specification specifying said task being represented as said precondition state, a sequence of states during said invocations, and said postcondition state.

15. The system of claim 14 and further comprising circuitry for specifying at least one protection describing a state property to be maintained during said sequence of states.

16. The system of claim 15 wherein said protection comprises a global protection.

17. The system of claim 15 wherein said protection comprises a local protection.

18. A method of specifying an expert system using process circuitry performing the following steps comprising:

generating a plurality of task specifications for specifying tasks as functional units of the expert system;

generating a plurality of method specifications for specifying a plurality of methods identifying a plurality of ways for accomplishing ones of said tasks;

specifying at least one said task as a subtask of a selected one of said methods, such that ones of said task specifications are organized as a structure having multiple levels of said tasks;

generating at least one task level task state expression specifying an interaction between a first one of said tasks at a first level of said structure and a second one of said tasks at a second level of said structure;

generating at least one method level task state expression specifying a control flow between each said subtask of said selected one of said methods, wherein one of said first and second tasks is a particular subtask of a particular one of said methods;

combining said task level task state expression with said method level task state expression; and verifying whether said particular subtask is consistent with said particular method in response to said combined task state expressions.

19. The method of claim 18, wherein said verifying step comprises the step of determining whether said particular subtask is weakly inconsistent with said particular method.

20. The method of claim 18, wherein said verifying step comprises the step of determining whether said particular subtask is strongly inconsistent with said particular method.

21. A method of specifying an expert system using process circuitry performing the following steps comprising:

generating at least one task specification for specifying a task as a functional unit of the expert system, said task being represented as a precondition state of the system before invocations of said task, and a postcondition state of the system after said invocations;

generating a state model including a plurality of state objects each representing a state of completion in a problem domain of the expert system; and specifying said precondition state and postcondition state relative to said state objects.

22. The method of claim 21 and further comprising the step of generating a model specification of said task including said state model and a domain model specifying domain objects of said task.

23. The method of claim 22 wherein said model specification generating step comprises the step of generating said domain model specifying at least one term relevant to said task.

24. The method of claim 23 wherein said domain model generating step comprises the step of generating said domain model specifying a relation relevant to said task.

25. The method of claim 24 wherein said domain model generating step comprises the step of generating said domain model specifying a relationship between multiple ones of said term.

26. The method of claim 24 wherein said domain model generating step comprises the step of forming said domain model specifying a property of at least one said term.

27. The method of claim 22 wherein said model specification generating step comprises the step of generating said state model specifying at least one relationship between multiple objects.

28. The method of claim 27 wherein said model specification generating step comprises the step of generating said domain model specifying at least one constraint on said relationship.

29. A method of specifying an expert system using process circuitry performing the following steps comprising:

generating at least one task specification for specifying a task as a functional unit of the expert system, said task being represented as a precondition state of the system before invocations of said task, and a postcondition state of the system after said invocations; and specifying said postcondition state as a soft postcondition state, such that said soft postcondition state is true after less than all of said invocations.

30. The method of claim 29 and further comprising the step of specifying an additional postcondition state as a rigid postcondition state, such that said rigid postcondition state is true after all of said invocations.

31. The method of claim 29 wherein said task specification generating step comprises the step of generating said task specification specifying said task being represented as said precondition state, a sequence of states during said invocations, and said postcondition state.

32. The method of claim 31 and further comprising the step of specifying at least one protection describing a state property to be maintained during said sequence of states.

33. The method of claim 32 wherein said protection specifying step comprises the step of specifying at least one global protection.

34. The method of claim 32 wherein said protection specifying step comprises the step of specifying at least one local protection.

* * * * *

UNITED STATES PATENT AND TRADEMARK OFFICE
CERTIFICATE OF CORRECTION

PATENT NO. : 5,434,952

DATED : Jul. 18, 1995

INVENTOR(S) : Yen, et al.

It is certified that error appears in the above-identified patent and that said Letters Patent is hereby corrected as shown below:

Column 6, line 35, after "postconditions" delete "4" and insert -- 84 --.

Column 10, line 33, after "(Task ID:1.1.1.2)"" insert -- , --;

Column 10, line 37, after "142" delete "at"@" and insert -- at "@ --;

Column 10, line 37, after "List" insert -- , --;

Column 10, line 42, after "at"" delete "Å"" and insert -- • --;

Column 10, line 67, after "at" delete "," and insert -- • --.

Column 20, line 16, after "R", delete "t" and insert --T--.

Column 20, line 54, after "Suppose," delete "is a global".

Column 22, line 34, after "in" delete "CM list" and insert -- CM-list --.

UNITED STATES PATENT AND TRADEMARK OFFICE
CERTIFICATE OF CORRECTION

PATENT NO. : 5,434,952
DATED : Jul. 18, 1995
INVENTOR(S) : Yen, et al.

It is certified that error appears in the above-identified patent and that said Letters Patent is hereby corrected as shown below:

Column 20, line 8, after "$C_1 \leftrightarrow ($" insert -- $\forall$ --.

Column 22, line 62, after "TBSM." insert -- The following describes R1/SOAR and an exemplary specification according to TBSM and TAME of process circuitry 10 of the preferred embodiment. --

Column 23, line 22, after "TSE", delete "$\varepsilon_r$" and insert -- $\varepsilon_T$ --.

Signed and Sealed this

Twenty-first Day of November, 1995

BRUCE LEHMAN

Attest:

Attesting Officer

Commissioner of Patents and Trademarks